(12) United States Patent
Shimpi

(10) Patent No.: US 11,468,514 B2
(45) Date of Patent: Oct. 11, 2022

(54) INTERACTIVE METHODS AND SYSTEMS FOR CONTROL OF INVESTMENT DATA INCLUDING DEMOGRAPHIC RETURNS

(71) Applicant: Prakash Shimpi, Florham Park, NJ (US)

(72) Inventor: Prakash Shimpi, Florham Park, NJ (US)

( * ) Notice: Subject to any disclaimer, the term of this patent is extended or adjusted under 35 U.S.C. 154(b) by 841 days.

(21) Appl. No.: 14/567,948

(22) Filed: Dec. 11, 2014

(65) Prior Publication Data

US 2015/0161734 A1    Jun. 11, 2015

Related U.S. Application Data

(60) Provisional application No. 61/914,785, filed on Dec. 11, 2013.

(51) Int. Cl.
*G06Q 40/06* (2012.01)
(52) U.S. Cl.
CPC .................................. *G06Q 40/06* (2013.01)
(58) Field of Classification Search
None
See application file for complete search history.

(56) References Cited

U.S. PATENT DOCUMENTS

| | | | |
|---|---|---|---|
| 7,949,588 B2 | 5/2011 | Willis | |
| 8,160,948 B2 | 4/2012 | Finfrock et al. | |
| 8,655,684 B2 | 2/2014 | van Breda et al. | |
| 10,565,654 B2 * | 2/2020 | Ameriks | G06Q 40/04 |

(Continued)

FOREIGN PATENT DOCUMENTS

| | | |
|---|---|---|
| CN | 101918972 A | 12/2010 |
| JP | H11-250165 A | 9/1999 |

(Continued)

OTHER PUBLICATIONS

National Institute of Securities Markets, "Workbook for NISM-Series-V-A: Mutual Fund Distributors Certification Examination" Workbook Version: Jul. 2011(https://www.principalindia.com/pdf/downloads/NCFM.PDF).*

(Continued)

*Primary Examiner* — Narayanswamy Subramanian
(74) *Attorney, Agent, or Firm* — Fox Rothschild LLP

(57) ABSTRACT

A computer-implemented method, system, and apparatus for managing investment savings of individuals through an investment vehicle suitable for retirement, estate or general investment planning. The invention establishes the mechanics of the operations to create an open-end investment fund as a means for individual participants to earn both market returns on their investments and demographic returns (DR) on the actual demographic experience of the pool of investors who participate in the investment fund. Individuals can invest in the fund and make additional deposits and withdrawals at any time. Investors specify a payout schedule, (Continued)

and those who sell their investments, as scheduled, earn full returns, combining market returns and the DR. Investors who make unscheduled withdrawals from the fund, receive lower returns. The investment fund is customized, and administered by computer software that is available to both participants in the fund and to asset managers who offer the fund to investors.

10 Claims, 13 Drawing Sheets

(56) References Cited

U.S. PATENT DOCUMENTS

| | | | | |
|---|---|---|---|---|
| 10,762,568 | B2* | 9/2020 | Simonds | G06Q 40/06 |
| 2002/0143680 | A1* | 10/2002 | Walters | G06Q 40/06 |
| | | | | 705/36 R |
| 2002/0152151 | A1* | 10/2002 | Baughman | G06Q 40/06 |
| | | | | 705/36 R |
| 2002/0169702 | A1* | 11/2002 | Eaton, Jr. | G06Q 40/02 |
| | | | | 705/36 R |
| 2003/0028464 | A1* | 2/2003 | Kosinski | G06Q 40/06 |
| | | | | 705/36 R |
| 2003/0028465 | A1 | 2/2003 | Kosinski | |
| 2003/0050879 | A1* | 3/2003 | Rosen et al. | G06Q 30/02 |
| | | | | 705/35 |
| 2003/0182290 | A1 | 9/2003 | Parker | |
| 2005/0027632 | A1* | 2/2005 | Zeitoun | G06Q 40/06 |
| | | | | 705/36 R |
| 2006/0190370 | A1* | 8/2006 | Halpin | G06Q 30/02 |
| | | | | 705/35 |
| 2007/0011063 | A1* | 1/2007 | Shelon et al. | G06Q 30/02 |
| | | | | 705/35 |
| 2011/0231337 | A1* | 9/2011 | Finfrock | G06Q 99/00 |
| | | | | 705/36 R |
| 2011/0258139 | A1* | 10/2011 | Steiner | G06Q 40/06 |
| | | | | 705/37 |
| 2012/0136807 | A1* | 5/2012 | Bendel | G06Q 40/04 |
| | | | | 705/36 R |
| 2014/0229402 | A1* | 8/2014 | Caron | G06Q 40/08 |
| | | | | 705/36 R |

FOREIGN PATENT DOCUMENTS

| | | |
|---|---|---|
| JP | 2006-202129 | 8/2006 |
| JP | 2008-135017 | 6/2008 |
| JP | 2008-537236 A | 9/2008 |
| JP | 2010-0527490 A | 8/2010 |
| JP | 2017504135 A | 2/2017 |
| WO | WO98/14902 A1 | 4/1998 |

OTHER PUBLICATIONS

Farmers Financial Services, Farmers® Variable Annuity I Prospectus, (May 1, 2005) (https://www.zurichamericanlifeinsurance.com/Reports/2005%20Farmers%20Variable%20Annuity%20I%20Prospectus.pdf).*

National Institute of Securities Markets, "Workbook for NISM-Series-V-A: Mutual Fund Distributors Certification Examination" Workbook Version: Jul. 2011(https://www.principalindia.com/pdf/downloads/NCFM.PDF) (Year: 2011).*

Farmers Financial Services, Farmers® Variable Annuity I Prospectus, (May 1, 2005) (https://www.zurichamericanlifeinsurance.com/Reports/2005%20Farmers%20Variable%20Annuity%20I%20Prospectus.pdf) (Year: 2005).*

International Search Report & Written Opinion, PCT/US2014/069756, dated Mar. 13, 2015.

JP Office Action JP2016-558536, dated Dec. 6, 2018.

Vashi, "NISM-Series-V-A: Mutual Fund Distributors Certification Examination", National Institute of Securities Markets, https:I/www.taurusmutualfund.com/pdflNISM_DIstributors_Workbook.pdf, Aug. 31, 2014 (Aug. 31, 2014).

English Translation of JP Office Action 2019-064545, dated Jul. 20, 2020.

* cited by examiner

INTERACTIVE METHODS AND SYSTEMS FOR CONTROL OF INVESTMENT DATA INCLUDING DEMOGRAPHIC RETURNS

CROSS-REFERENCE TO RELATED APPLICATION

This application claims the benefit of U.S. provisional patent application No. 61/914,785 filed on Dec. 11, 2013, the entire content of which is incorporated herein by reference thereto.

FIELD OF THE INVENTION

The invention relates to a method, system, apparatus and media for managing investment savings of individuals through an investment vehicle suitable for retirement planning, estate planning or general investment planning. More particularly, the invention creates an investment fund as a means for individual participants to earn both market returns on their investments and demographic returns (DR) on the actual demographic experience of the pool of investors who participate in the investment fund.

BACKGROUND

Financial services companies, such as asset managers, banks and insurance companies offer investors several investment choices. These investment choices provide the opportunity for investors to earn investment market returns, while also exposing them to investment market risks. Market return is the total return on an investment over a given time period from capital markets sources, e.g., dividends, interest, and capital gains. Market risk is the risk of losses in investment positions arising from movements in market prices.

Asset managers provide funds in which investors can make deposits to earn market returns, less asset management fees, and investors bear all the market risk of their investments. Similarly, banks provide deposit instruments (e.g., certificates of deposit) and investment funds, both of which provide market returns to investors while exposing them to market risk. For this description, it will be convenient to refer to these investment vehicles as "investment funds," and the term "asset manager" will refer to providers of investment funds including banks and some insurers but the system is not limited to only these terms.

Insurance companies may offer immediate and deferred annuities with a variety of living benefits and death benefits, for which they may charge benefit fees, as well as asset management fees. An annuity product usually requires a deposit or a premium, which then may be invested by the insurer. Insurers provide guarantees such as minimum fund performance or minimum level of living benefits or death benefits, so that the investor may be partially shielded from market risk while earning some of the market return on investment. In the following description, these types of funds may be referred to as "insured funds" and the term "insurer" to describe any type of providers of insured funds. Some insurance companies may also offer investment funds similar to the asset managers described above.

Many investors rely on advice from third parties financial advisors, for example Registered Investment Advisors in the US. These investment advisors may assist an investor construct their portfolio of investment and insurance funds, either directly or through their employer or other organization. In some instances, these advisors also perform certain duties that may appear to be either management of investment funds or insurance funds, even if they do not actually manage those funds. For the purposes of this description, any financial advisor that actually offers investment funds or insured funds to an investor as described herein would be considered to be an asset manager or insurance company.

Although investment funds and insured funds enable investors to save for the future, there are some important differences between them. For example, investment funds usually do not make any guarantees of investment performance, while insured funds often do, either explicitly (by stating the guarantees) or implicitly (via the premium pricing formula). Also, investment funds usually only charge fees for their services, while insured funds may charge both fees for services and premiums for the insured benefits. Besides suitability criteria, asset managers usually do not underwrite investors for factors such as age, gender and health when accepting deposits in investment funds, while insurers usually do so before accepting deposits in insured funds. As a consequence, bona fide investors can usually invest in an investment fund at any time, but they may be turned down from investing in an insured fund if they do not meet the insurer's underwriting criteria. Investment funds do not usually consider the demographic experience of their investors, while insured funds usually do. Insurers may explicitly use the concept of pooling the "risk of individuals" so that the collective demographic experience of mortality, morbidity, lapse and other behavioral characteristics is considered when calculating the premium and benefits to be provided to policyholders (i.e. investors in insured funds). An insurer usually manages all the premiums it receives through a single general account where investment performance and demographic experience are shared by all policyholders across all insured products, and several separate accounts, where investment performance and demographic experience are shared only by those policyholders who invest in the same separate account, but is not limited to only this example. Investment funds usually do not have to consider the "intergenerational equity" of their investors since every investor may buy and sell their holdings at any time, and different generations of investors can participate in an investment fund, irrespective of the investment performance or demographic experience of other investors. Insurers may perform actuarial calculations to ensure that premiums and benefits are broadly equitable on an intergenerational basis to ensure fair treatment of policyholders in an insured fund who start their participation at different times and can leave the insured fund at any time in the future. By nature of its construction, an insurance fund is usually expected to be equitable across the pool of insured policyholders, but it can be more or less economic than alternative investment vehicles for any particular individual. For example, an investor who purchases an annuity "wins" by getting a greater payout of benefits if he or she lives longer than expected, and priced for, by the insurer. In this case, the additional annuity payments are paid for by the insurer, by indirectly using, for example, portions of payments made by other investors in the insured funds, insurance products, and the insurer's shareholders. Insurance companies can offer some insurance products that are not part of an insurance fund. On the other hand, that same investor would "lose" if he or she died before their expected lifespan since they would not receive as many annuity payments, and would essentially have overpaid premiums relative to benefits received. In this case, their relative overpayment can be used in part to pay the insurer's shareholders and also in part to fund the benefits of policyholders with greater longevity. Since asset managers usually do not make any performance guarantees or provide any insurance-type benefits, they may not have any insurance-type liabilities that require reserves to be held against those promises. Insurers usually do have to hold reserves against the promises they make, and consequently have to hold capital against the risk that the assets and reserves fall short of requirement in adverse scenarios.

Both insurers and asset managers may enable investors to build wealth over time that becomes a source of income for the future. Although there are many reasons for an investor to save, a major motivation is to save for retirement. In the US and globally, improvements in health and safety have resulted in an increase in longevity, thereby increasing the number of years that an individual spends in retirement. Simply put, individuals are concerned about outliving their savings. This has resulted in a global demand for investment vehicles that grow savings and generate cash flow during retirement years.

Asset managers have responded to this demand by providing a variety of investment vehicles that allow investors to seek returns in various sectors and slices of domestic and global capital markets. Irrespective of the vehicle and the particular investment focus, the basic underlying structure remains the same, i.e., investors take on market risk to earn market returns. Since there is no guarantee of investment returns or income generation, the only way for an asset manager to help an investor build wealth is to provide superior market returns relative to the risk undertaken. As investors age, they tend to shift their investment focus from riskier asset classes to relatively safer asset classes. Asset managers provide investment funds that make that shift automatically (e.g., using target date funds) or at an investor's discretion. If cash needs in retirement exceed the income generated by investments, an investor has the ability to sell part of his or her holdings to generate more cash. One downside of such an approach is that once the holdings are fully sold off, there is no further income from that investment.

Insurers have responded to this demand for retirement cash flow by selling several types of annuities to investors or policyholders. A life-contingent annuity transfers the risk of outliving one's assets to an insurance company. There are a variety of annuities available to investors, but most fall into one of two broad categories—deferred annuities and immediate annuities. A deferred annuity is usually purchased before an investor retires by making a deposit in an insured fund. The period between the purchase date and the annuitization date may be referred to as the "accumulation phase" during which invested assets grow with market return and/or any guaranteed return. At the end of the accumulation phase, the "payout phase" begins and the investor receives regular income or an annuity that is based on the accumulated wealth, reinforced by the guarantees that were included in the deferred annuity policy. An immediate annuity usually does not have an "accumulation phase," so the investor may make a deposit in an insured fund to purchase an income stream starting immediately (typically one month after purchase).

At the time of purchase or annuitization, an investor can select the length of term for receiving annuity payments. An annuity can be purchased for a certain term, e.g. 30 years, irrespective of the actual years that the investor lives—this does not transfer any longevity risk to the insurer. A lifetime benefit would pay an annuity regardless of the length of time that the investor lives—this option transfers the entire longevity risk to the insurer. Not surprisingly, a lifetime annuity would be attractive to investors concerned about longevity risk, but due to the amount of risk transferred, the up-front premium required to be deposited in the insured fund will also be relatively higher than products without a lifetime guarantee.

Insurers have also recognized that investors who are comfortable with investment returns generated by the insurer's general account tend to opt for "fixed" annuities. Investors who prefer to have more control over their investment choices tend to opt for "variable" annuities and invest some or their entire portfolio in separate accounts. In a fixed annuity, the insurer bears the market risk, and the investor receives a guaranteed rate that is reset periodically, irrespective of the actual underlying performance of the assets. In a variable annuity, the investor bears the market risk and their asset values can rise and fall with investment returns, although some of that risk is mitigated by the insurer's guarantees.

Irrespective of these and other features not described herein, annuities are paid out of deposits invested in insured funds, so they provide investors with some participation in market returns, while shielding them from the full impact of market risk.

Besides insurance companies, tontines are another vehicle for pooling mortality risk. In the US and other countries, tontines are no longer allowed. Kent McKeever, Director of the Diamond Law Center at Columbia University, defines a tontine in his article, "A Short History of Tontines" (*Fordham Journal of Corporate and Financial Law*, 2009) as follows:

> A tontine is an investment scheme through which shareholders derive some form of profit or benefit while they are living, but the value of each share devolves to the other participants and not the shareholder's heirs on the death of each shareholder. The tontine is usually brought to an end through a dissolution and distribution of assets to the living shareholders when the number of shareholders reaches an agreed small number.

As noted in the article, this definition of a tontine is broad enough to include a range of insurance products currently offered today. It may be useful to consider some characteristics of a tontine. First, a fixed pool of participants become members of a tontine at inception, so no new participants are able to join after inception. Second, insurance-type underwriting is required so that the age, gender and health characteristics of participants are substantially alike. Third, the payouts to participants systematically benefit the last survivors at a loss to participants who die early.

In an article titled "A Mutual Fund to Yield Annuity-like Benefits" (*Financial Analysts Journal*, Vol. 63, 2007), Ralph Goldsticker of Mellon Capital proposed an annuity-tontine combination that would be offered to age- and gender-specific cohorts of investors.

In their article titled "Tontines For the Invincibles: Enticing Low Risks Into The Health-Insurance Pool With An Idea From Insurance History And Behavioral Economics: (*Wisconsin Law Review*, Vol 2010, pg 79; *University of Pennsylvania Institute for Law and Economic Research Paper No. 09-07*), Tom Baker and Peter Siegelman trace the history of life insurance tontines in the United States and the possible application to health insurance. They note that life insurance tontines were a product that entitled survivors to receive a deferred dividend as a bonus upon survival after a certain number of years. Tontine life insurance became so successful that it was reined in by regulators in 1906. The authors point out that recent developments with variable annuity products replicate some of the bundling of insurance and investment features of the early life insurance tontines.

The present invention described herein is not a tontine. In particular, the investment fund is an open-ended fund, so new participants can join at any time in the future, and current participants can make additional deposits and make withdrawals in the future. Insurance-type underwriting is not required, so homogeneity of participants is not a requirement. Finally, there is a range of possible payouts for participants who leave early as well for those who stay longer, so there is no systematic structure that guarantees that the last survivors are always better off than investors who leave earlier for any reason, including death.

The present invention is also not a life insurance tontine. For example, the invention does not require payment of an insurance premium and there is no assumption of the investor's risk by the financial institution, both of which are necessary parts of the definition of a life insurance tontine.

Insurers and asset managers have been competing, collaborating and learning from each other to provide better products and choices for investors. Nevertheless, the differences described above remain, particularly regarding demographic experience. Insured funds may include the expected and actual demographic experience of investors or policyholders when determining premiums or deposits and benefits, although that link may not be explicit or made clear and transparent to investors. Where insurance companies and investment funds do provide some participation in the demographic experience of investors or policyholders in their products, it is done on a "synthetic" basis rather than on an "actual" basis as described further below.

Insurance companies develop assumptions for expected demographic experience (for example, mortality and withdrawal events, additional business by new policyholders, new contributions by existing policyholders and other policyholder behavioral characteristics) that they use in pricing and benefits calculations for products offered in insurance funds, and for reserves and capital used to support those products. Insurance companies hold reserves and capital to absorb and smooth out the difference between actual and expected demographic experience as it emerges over time, as well as to provide for other contingencies in their business. As actual demographic experience emerges over time, the insurance company may update their assumptions for expected future demographic experience. In some instances, insurance companies may modify future premiums or benefit amounts based on the actual demographic experience of the group of policyholders on a collective basis, while at the same time adjusting their reserves and capital to meet future deviations from expected demographic experience. Deviations from past demographic experience are absorbed by the insurance company's reserves and capital and not used to adjust previously collected premiums or paid benefits. In other instances, some policyholders may receive a share of profits that may arise when the difference between actual and expected demographic experience generates gains for the insurance companies. This is particularly true for mutual life insurance companies where policyholders are also shareholders of the mutual insurance company. The mutual insurance company may pay a dividend to policyholders that reflects a participation in the company's profits, some of which may have arisen from the profits due to past demographic experience. These practices by which insurance companies reflect policyholder demographics in future premiums and benefits or provide a share of profits earned due to past demographic experience are herein termed as "synthetic" since: (1) various actuarial formulae and calculations are used to a create a limited and approximate participation in the actual demographic experience of policyholders; (2) other groups such as insurance company investors and managers may also share in any gains from actual demographic experiences; and (3) such limited participation is not generally concurrent with the occurrence of the actual experience but allocated at some later time.

Currently, investment funds do not provide any participation in the demographic experience of their investors, so that is not considered in determining returns to investors. Some investment funds may offer investors a participation in mortality risk, for example by including life-contingent insurance-linked securities (ILS) in the investment portfolio, or by linking the return on the portfolio to a mortality or demographic index. (An ILS is a type of asset-backed security that is exposed to the demographic experience of a pool of insurance or pension policies either on an indemnity basis, i.e., actual experience of the pool of insured policyholders, or an indexed basis, i.e., by reference to a mortality index that is a proxy for the actual experience of the pool of insured policyholders.) Such funds do offer a participation in the demographic experience of the pool of insured policyholders through the reference securities or indices, but they do not offer the investor any participation in the actual demographic experience of fellow investors in that investment fund. As such, these investment funds also provide investors a "synthetic" basis for participation in demographic experience since the experience may be with reference to an index or to a population of policyholders that is different from the investors.

In contrast to the "synthetic" basis described above, the present invention uses an "actual" basis to provide demographic returns to investors. Such an "actual" basis means that: (1) investors directly contribute to and benefit fully from participation in the actual demographic experience of fellow investors in the same investment fund, without reference to an expected or indexed demographic experience or such similar synthetic device; (2) the actual demographic experience is fully reflected in the economic returns, net of fees, available to investors concurrent with the occurrence of such actual demographic experience; and (3) there is no necessity of creating and maintaining a reserve or capital buffer to absorb variations between the actual and an expected, indexed or such other synthetic demographic experience.

One method for expanding on the prior art is to develop an open-ended investment vehicle that enables investors to participate in the actual demographic experience of fellow investors in an investment fund.

BRIEF SUMMARY OF THE INVENTION

In accordance with principles of one embodiment of the present invention, systems, methods, and computer readable medium are provided that implement an investment fund having a demographic return feature.

One aspect of the invention disclosed and claimed herein comprises a computer-implemented method, system, apparatus and non-transitory media to create and implement an investment fund that provides investors (participants) both market returns and demographic returns on their investment. One embodiment of the invention establishes the mechanics of the operation, and implementation by the computer system, of the investment fund for both the participants in the fund and the asset managers who offer the fund to investors.

One embodiment of the invention is referred to as a Participating Retirement Investment Account (PRIA). The PRIA is a new type of investment fund that enables individual investors to save for retirement. It is a novel implementation of the concept of risk pooling based on the demographic behavior and experience of individual participants who invest in a PRIA fund. A PRIA fund may be offered by an asset manager to investors either through their retirement savings plans (known as qualified and non-qualified plans in the US) or individually (i.e., not as part of any retirement savings plan). PRIA is an investment fund and not an insurance fund. Embodiments can also include an investment fund that includes some characteristics of an insurance fund but without departing from pertinent characteristics of an investment fund consistent with some or all of the objects and necessary operation of embodiments of the present invention. An investment fund that incorporates some features of an insurance fund but remains substantially an investment fund, would still be considered an investment fund. Features such as requiring underwriting for entry into the fund, or requiring that the fund participant fall in the same classification (e.g., participants in the same fund must be in the same insurance age bracket or demographic), or provision of a minimum guaranteed return on investment would be characteristics that would cause an investment fund to effectively be an insurance fund. In general, when combined with features of insurance products such that PRIA would be regulated as an insurance product, PRIA may also be offered via an insurance fund such as an insurance company Separate Account or General Account, in the US. PRIA and embodiments of the present invention can enable investors to participate in both market returns (without guarantees) and demographic returns.

An asset manager (including one that may be part of an insurance company) may set up and offer an open-ended PRIA fund to investors. Any individual can join a PRIA fund and make deposits and withdrawals at any time, and there is no requirement for insurance-type underwriting based on age, gender or similar factor. Participants or investors may deposit money into a PRIA fund, and through it, into a choice of sub-funds (such as mutual funds) where their money is invested. (In an alternative embodiment, the choice of sub-funds may be limited to a single sub-fund, in which case the mechanics of the PRIA fund and the sub-funds may be collapsed into a single investment fund.)

A participant may earn a return from two sources. The first source may be a market return, which is the change in their investment due to market dynamics, e.g., dividends, interest, and capital gains and losses. The second source may be the demographic return (DR), which is the change in their investment due to the change in the demographics of their fellow investors—this is the pooling of demographic risk.

Participants can sell their investments in each of the sub-funds that they own at any time with usually two consequences. First, if the sale is based on a pre-arranged schedule (typically after many years when the participant is in retirement and needs money to cover living expenses), the participant receives a higher return reflecting a combination of the market return and the DR. Second, if the sale is made voluntarily or upon an individual's death, the participant or beneficiary (in the case of death) receives a lower-than-market return according to a schedule defined by the asset manager.

The difference between the higher return and the lower return may be contributed to a DR sub-fund. For simplicity, the DR sub-fund is described as a single, separate investment fund, although other alternatives are also available, as described below. All PRIA participants may be credited with a proportional share of the DR sub-fund based, for example, on the amount of their total investment in the PRIA fund, or some other crediting formula. The DR sub-fund may be managed by the asset manager, and the investment strategy and performance will be described in a manner similar to other sub-funds offered to investors.

There are other investment products that offer different returns based on investor actions. For example, a bank's Certificate of Deposit pays interest to investors if they remain invested for the full term. If an investor withdraws early, they do not receive the interest—and the bank retains that interest. PRIA's differentiated returns between participants who make scheduled and unscheduled withdrawals follows in the same spirit as the bank CD's differentiated interest payments. PRIA's innovation, at least one respect thereof, is that the source of the DR return is the demographic actions of individual participants, and the DR return is shared by the remaining participants.

A PRIA participant is not charged any insurance-type premium and does not receive any insurance-type benefits or guarantees. Such benefits and guarantees can be sold separately as an option to the participant, for a separate fee. Such insurance-type features may also be combined with PRIA in order to qualify the product as an insurance product under local insurance regulations.

The asset manager can offer several optional features and several required components. For example, the asset manager may require that, at inception when the participant makes the first deposit, they select a date at which they will start to make scheduled sales of their holdings, the period over which the holdings will be sold, and the proportion of holdings or the dollar amount of sales to be generated at each date. (This is similar to the accumulation phase and payout phase of a deferred annuity.) The asset manager may require a minimum number of years before scheduled sales begin and a minimum number of years over which the scheduled sales are conducted. The asset manager will disclose how the lower asset value is calculated in the event that an investor has an unscheduled sale of any part of their holdings. Transfers between sub-funds under the same PRIA fund could be allowed without any loss of value, except for any administration fee charged by the asset manager, since that does not result in a withdrawal from the PRIA fund. More details of these features and components are described below.

From the asset manager's perspective, the PRIA fund operates in a similar fashion to their other investment products, except for the inclusion of the demographic return component. As such, implementation can be characterized as an "overlay" on top of regular fund sales and administration. This means that the PRIA system and process can be added on to an asset manager's conventional investment fund systems and processes. Since the asset manager is not offering any guarantees, and all payments to participants come from accumulated invested deposits, no insurance-type reserves need to be held. A single asset manager can offer several PRIA funds, each with its own features to cater to different segments of their client base.

From an investor's perspective, the PRIA fund operates in a manner similar to a standard retirement savings vehicle, with some differences related to the operation of the DR aspect. The investor can make an initial deposit and additional deposits into the PRIA fund at any time, subject to the rules of any retirement plan, if the PRIA fund is offered under such a plan. There is no age, gender, medical or other insurance-type underwriting process required when investing in a PRIA fund, although the asset manager may choose to do so at their discretion. If the investor elects to purchase additional insured benefits that are available at the same time, then an underwriting process may be required. There may be no requirement to elect a retirement age at which date payouts would be made, although the investor would most likely be required to elect a starting date at which scheduled payouts would be made. The investor can withdraw funds at any time, with the provision that unscheduled, early withdrawal results in a lower payout than a scheduled sale. With each deposit, the investor makes a selection of sub-funds based on their individual preferences, and allocates their deposit accordingly. The investor has a view of their investment position on a regular (e.g., daily) basis, and can track the market return they are receiving, as well as the contribution from their share of demographic return. An investor can invest in more than one PRIA fund to diversify both their market return as well as their demographic return opportunities.

From an economic perspective, PRIA provides demographic risk pooling without charging a premium to each participant for the demographic risk of the pool. Since no death benefits, withdrawal benefits, or pensions benefits are provided within PRIA, the investor should not pay an insurance-type premium. The PRIA fund operates on a zero-sum basis, i.e., the PRIA fund is a closed system in which all invested assets ultimately pay all scheduled and unscheduled payouts and fund expenses. Each participant can become a contributor to the DR sub-fund by making unscheduled sales of some or all of their holdings early, or a receiver from the DR sub-fund by making scheduled sales of their holdings, or both a contributor and receiver if they make both scheduled and unscheduled sales of their holdings. Since the potential amount that an investor may contribute to the DR does not depend on their age but rather on the length of time they are invested in the PRIA fund, the concept of generational equity described for insurance products does not apply in the same way.

An investment in a PRIA fund is expected to form part of a portfolio of financial planning instruments that an individual would own. They would use life insurance to protect their family from their untimely death. They would own traditional investment funds to grow wealth and to preserve liquidity for unplanned financial needs. The PRIA fund forms part of that portfolio to enable an investor to save for the long-term, and to have a mechanism to maximize the investments that they can draw from in their retirement years.

A participant in a PRIA fund is making an economic trade-off based on their utility of having funds in retirement versus having to forego some of their investment return upon unscheduled voluntary or involuntary (death) early withdrawal. For instance, an investor can rationalize that upon death they do not need the full return on their investments so long as a sufficiently reasonable amount is paid to their heirs, while they would prefer to have a higher payout stream in retirement to support their lifestyle in old age.

A computer implemented system can be implemented that is structured to carry out the foregoing functionalities and provide related interacted features and tools. A computer-implemented system can be directed towards managing an investment fund having a demographic return feature. The system comprises one or more computers and connected electronic storage that stores computer-executable instructions and data that is used by the computer-executable instructions, wherein the one or more computers, the computer-executable instructions, and data, together, configure the computer system to provide an interactive application that processes a structure for the operation of the investment fund which includes handling interactions with potential participants, participants, and administrators by way of network connections with client end devices. The interactive application may also be referred to as the PRIA Overlay System (POS) or implemented by the POS.

The computer is also configured to register participants in the investment fund, and receive and store personal information about the participants. The computer is further configured to create individual accounts for participants in the investment fund, wherein accounts are available to be created in the same investment fund for participants that are in multiple diverse classifications and provide an account creation interface through which participants self-select a start date and payment schedule for a liquidation phase of their account, wherein the self-select start date can be configured to begin immediately or at some time in the future. The POS may also provide the account creation interface.

The computer is also configured to receive and store principal data identifying one or more investment contribution deposits made by each participant into the fund and generate and store ownership data that identifies an ownership stake generated from the use of the investment contribution deposit for each participant in an investment vehicle available in the investment fund.

The computer is configured to implement the structure governing the operation of a demographic return fund as part of the investment fund and generate and store additional ownership data by creating ownership in the demographic return fund as part of the investment fund, wherein the system is configured to create the demographic return ownership units for each participant in the investment fund by a specified formula.

The computer is further configured to receive investment return data about a market return generated from a corresponding investment vehicle and generate output data that specifies a calculated current value of a participant's ownership stake in their investment vehicle. The computer is also configured to implement an account value interface through which the computer system interacts with other computer systems to receive and provide information about the current value to fund participants, wherein the current value contains a current value of the investment contribution of that participant in the investment vehicle incorporating market returns and a current value of demographic return ownership units of that participant. The POS may also provide the account value interface. The computer is configured to implement a withdrawal interface through which participants request to withdraw funds from their account and implement a client life status interface through which a participant's death is reported to the system and the system automatically closes individual accounts upon notification of each participant's death, and withdraws and issues payment of account value, subject to applicable deduction or charges, to designated beneficiaries. The POS may also provide the client life status interface.

The computer is further configured to deduct a calculated amount of the current account value from a corresponding account and automatically deposit the deduction into the demographic return fund when one or more individual participants die before that participant's self-selected payment schedule has been fully met, or when one or more individual participants request to withdraw from their account before that participant's self-selected payment schedule has been fully met, wherein the computer system manages the demographic return fund such that the automatic deposits are substantially all of financial contributions by deposit into the demographic return fund. Preferably, the automatic deposits are all of the financial contributions but it is not limited to this. The computer is also configured to implement a payment process that processes withdrawal requests and generates an output signal indicating approval of the withdrawal and issues a signal that issues a transfer to accomplish the payment and a display of the amount of payment and implement a demographic return account value interface, wherein the demographic return account value interface adjusts upwards the current value of participant ownership units in the demographic return fund when the automatic deposits are made into the demographic return fund upon the death of participants and closing of corresponding accounts or upon withdrawals made before the self-selected payment schedule has been fully met, and wherein the demographic return account value interface adjusts the current value of participant ownership units in the demographic return fund by incorporating financial returns generated from investment of contributions and reinvestment of financial returns in the demographic return fund.

The computer is configured to issue scheduled payments from the investment fund starting from the specified start date selected by each participant, determine withdrawal amounts from the investment fund for the amount of payment from each participant's current value from their investment vehicle and current value of that participant's current ownership units in the demographic return fund.

In one embodiment, the system further comprises a fund termination component that is configured to determine, as an ongoing process, whether a certain minimum amount of investment remains in the fund, minimum number of participants remain in the investment, or certain minimum level of diversity in the classification is maintained, and closes the fund when the system determines that data reflects that the fund is below the minimum. In another embodiment, the system further comprises wherein the fund termination component is configured to perform the ongoing process after a preconfigured inception period is completed. In yet another embodiment, the system comprises a fund termination component that after an initial inception period monitors characteristics of the investment and if certain characteristic or characteristics are met terminates the fund and issues corresponding payments. In one embodiment, the system comprises wherein the account creation interface provides each participant with the option to select from different investment vehicles for application of their investment contribution.

In another embodiment, the system is further configured to permit participants to make additional investment contributions after their account has been created. In yet another embodiment, the system is further configured to close a particular participant's account when that participant's scheduled payments have ended. In one embodiment, the computer system is further configured to include an administrative interface that provides interactive options that allow fund providers to configure working characteristics of the fund. In another embodiment, the computer system is also configured to be implemented as an overlay system. In yet another embodiment, the computer system is further configured to include a sales system that provides models of the operation of the investment fund incorporating a demographic return fund. In one embodiment, the computer system is also configured to allow participants with diverse age classifications including participants in their 20's, 30's, 40's, 50's, and 60's. In another embodiment, the computer system is also configured to allow participants with diverse gender classifications including male and female participants. In yet another embodiment, the computer system is further configured to allow participants with diverse health classifications.

In one embodiment, the system further comprises wherein the computer systems implements the investment fund as an open ended fund. In another embodiment, the system comprises wherein the computer system subjects withdrawals or investment contributions to administrative expenses or fees for managing the investment fund. In yet another embodiment, the system further comprises wherein the demographic return fund is designed so that the current value of demographic return fund is zero until a first automatic deposit is performed when a participant dies or an early withdrawal is requested. In one embodiment, the system further comprises an interface for interactivity with financial advisors or other intermediaries. In another embodiment, the system further comprises that the self-select start date and payment schedule may be modified by the participants. In yet another embodiment, the system also comprises that the ownership units in the demographic return fund are derived from the ownership stake in the investment fund using the specified formula.

In one embodiment, the system further comprises that the specified formula can use factors other than the ownership stake in the investment fund to determine ownership units in the demographic return fund. In yet another embodiment, the system also comprises a component that permits participants to login to view the status and value of their account from a website or client application, and to also request to make withdrawals or terminate the account and in response, the fund processes the requests and generates graphical display and issues payments from the investment fund. In one embodiment, the system further comprises receiving a request to open account over network connections from a potential participant and stores potential participant information specifying the classification of each potential participant, uses that information to open an account and set up the investment fund, and also uses the data to check threshold information about classification to determine whether to close the fund.

In another embodiment, the system is further configured to allow one or more participants to make a specified number of withdrawals without applying a deduction of the calculated amount of the current account value from the corresponding account. In yet another embodiment, the self-selected payment schedule is subject to approval by an administrator or asset manager of the system, as well as any modifications to the payment schedule. In one embodiment, the self-selected payment schedule is modifiable as permitted by the asset manager. In another embodiment, some of the modifications are subject to a fee. In yet another embodiment, the payment schedule is required to include a minimum number of payments and/or require a minimum period of time before any payments will be paid out. In one embodiment, the system is further configured to provide a participant with the option to take less than the scheduled payment amount on any particular payment date.

A computer-implemented system can be directed towards implementing an interactive platform on a computer system that permits the creation of a fund having a demographic return fund and including interfaces for participants, administrators, and fund managers to interact with the fund to deposit, withdraw, or view funds, wherein the system is configured to include the demographic return fund as an open fund that receives deposits as a result of fund participant's early withdrawal or death before that participant has been paid under their self-selected start and payment schedule.

A computer-readable storage medium such as a non-transitory computer readable medium can comprise instructions executed by a processor or electronic device to perform at least some of the steps of at least some of the system described herein (e.g., so as to provide features, functions, processes, or systems described herein).

It will be understood by those of ordinary skill in the art after reading the disclosure and as expressed herein that if desired, one or more features of elements of the exemplary system, method, or computer readable medium can be removed, modified, or re-arranged to arrive at a broader or different version of the system, method, or computer readable medium without departing from the spirit and scope of the invention.

BRIEF DESCRIPTION OF THE DRAWINGS

Figure 1:
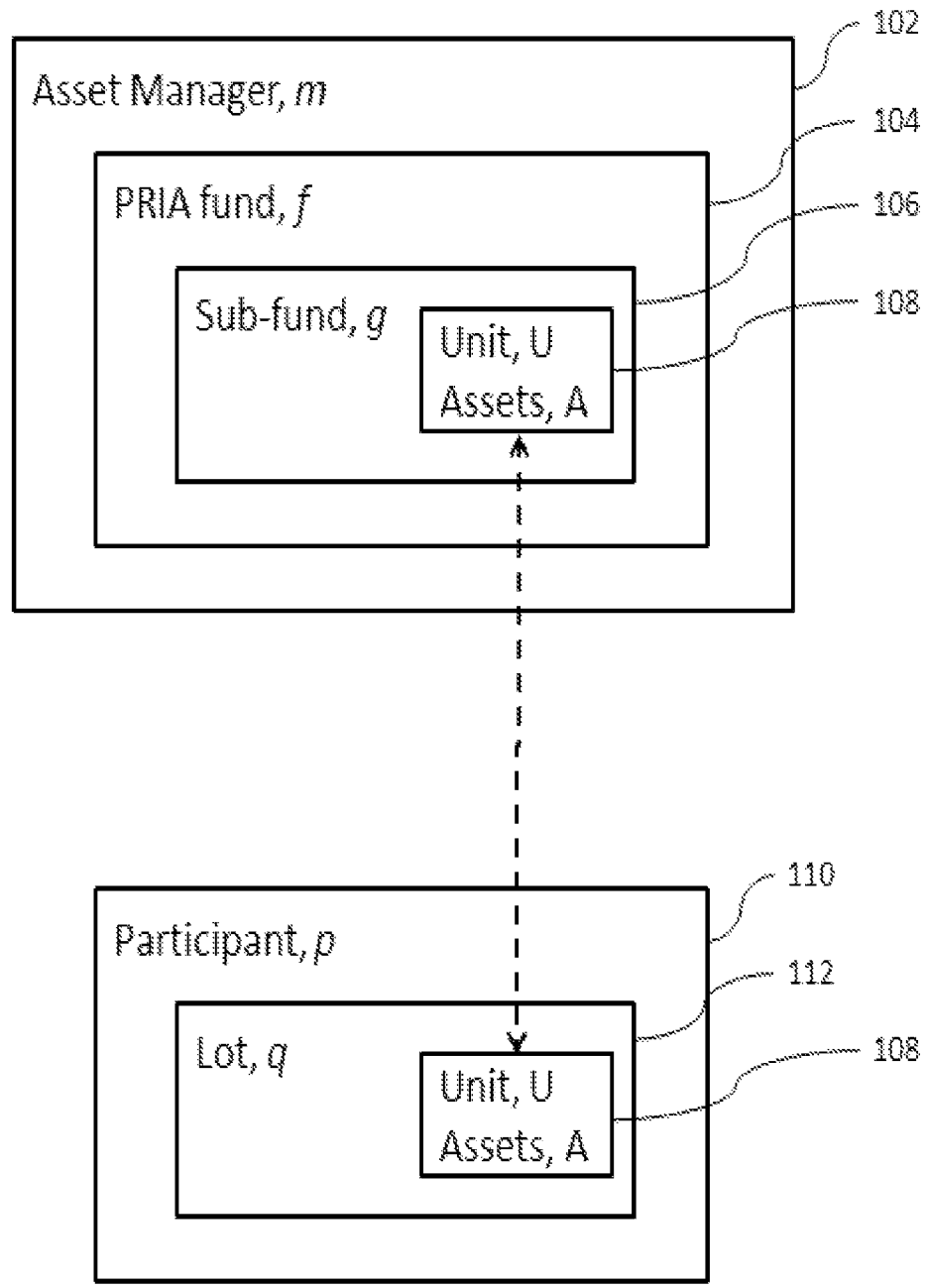
Figure 2:
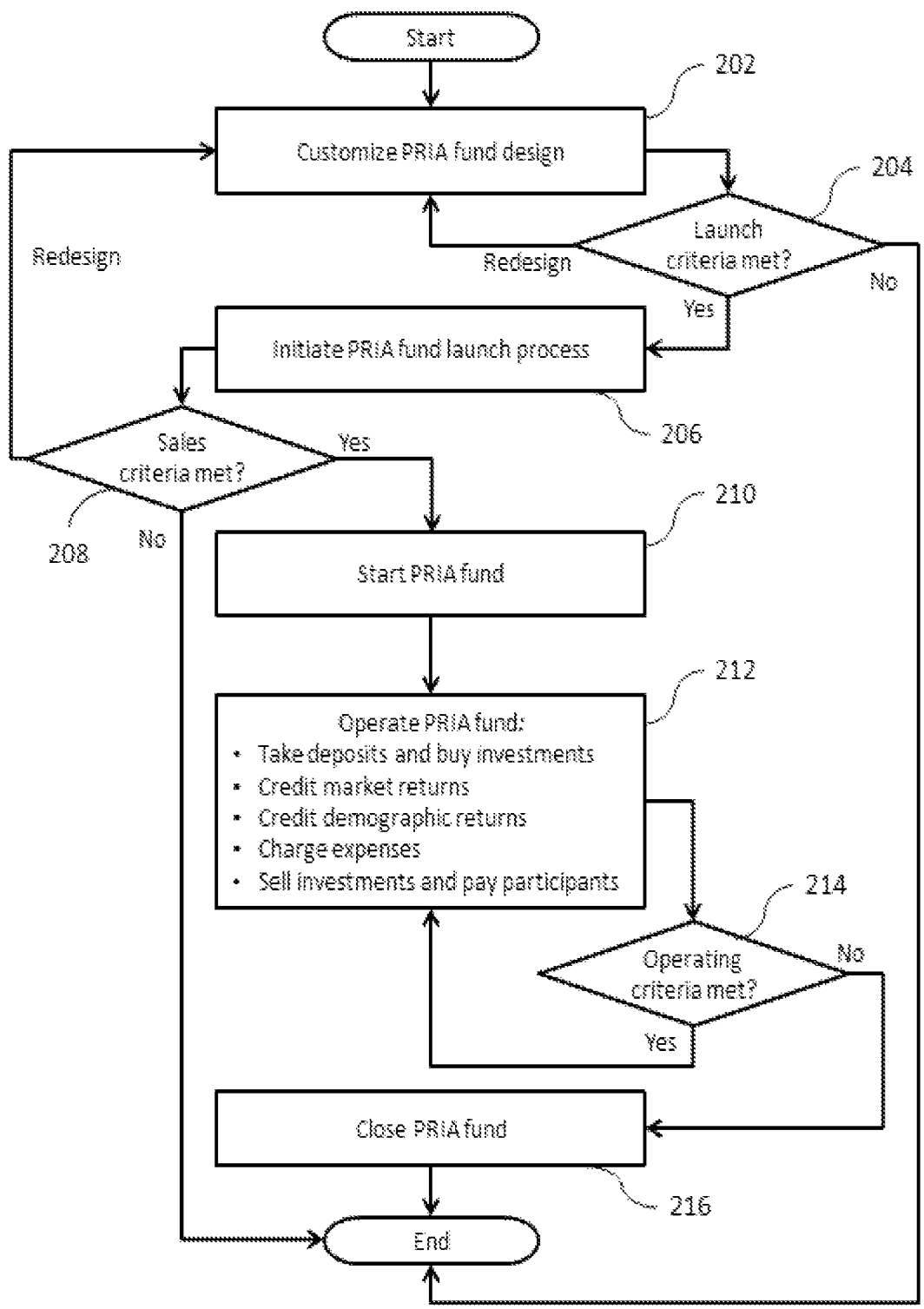
Figure 3:
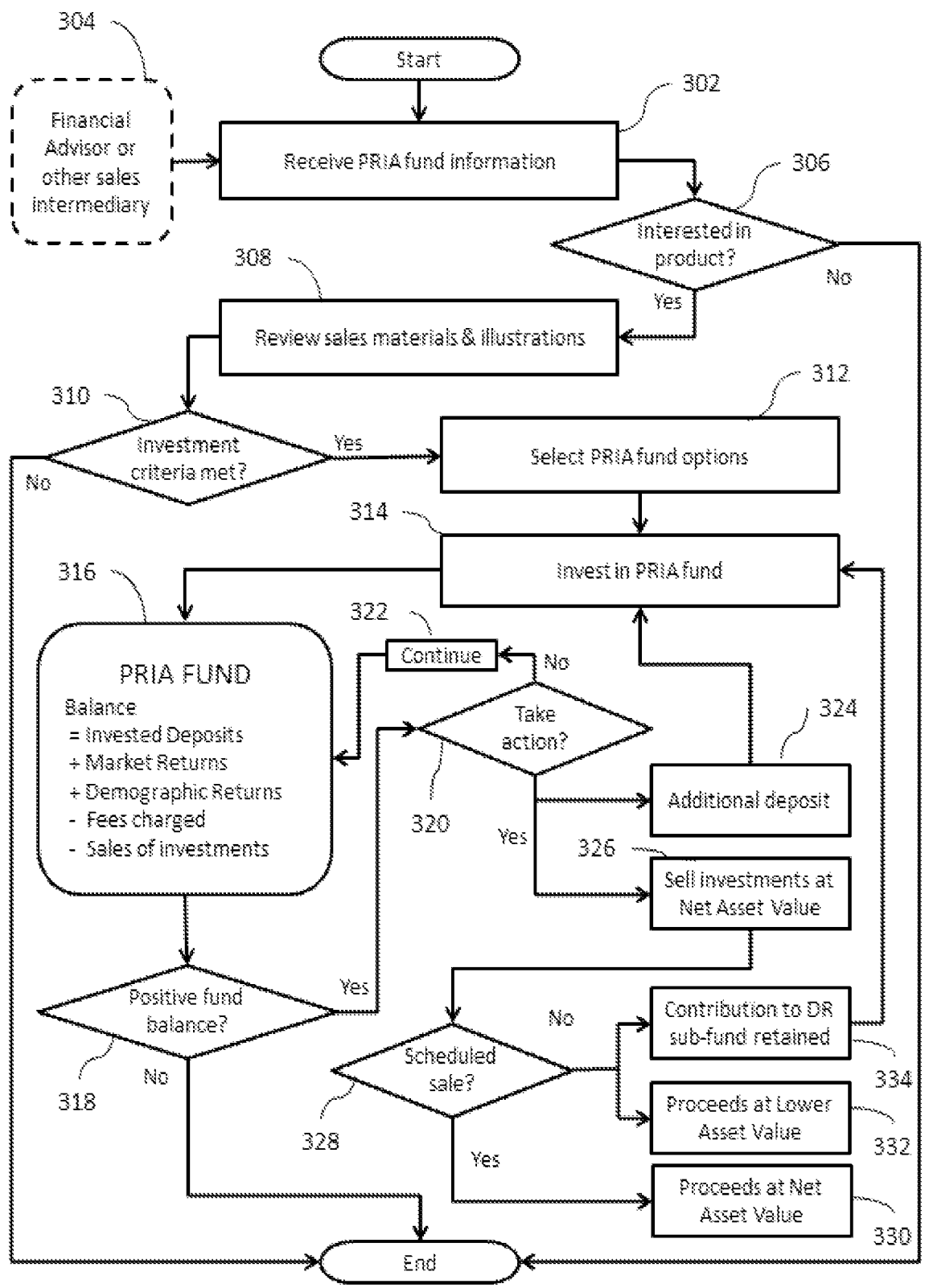
Figure 4:
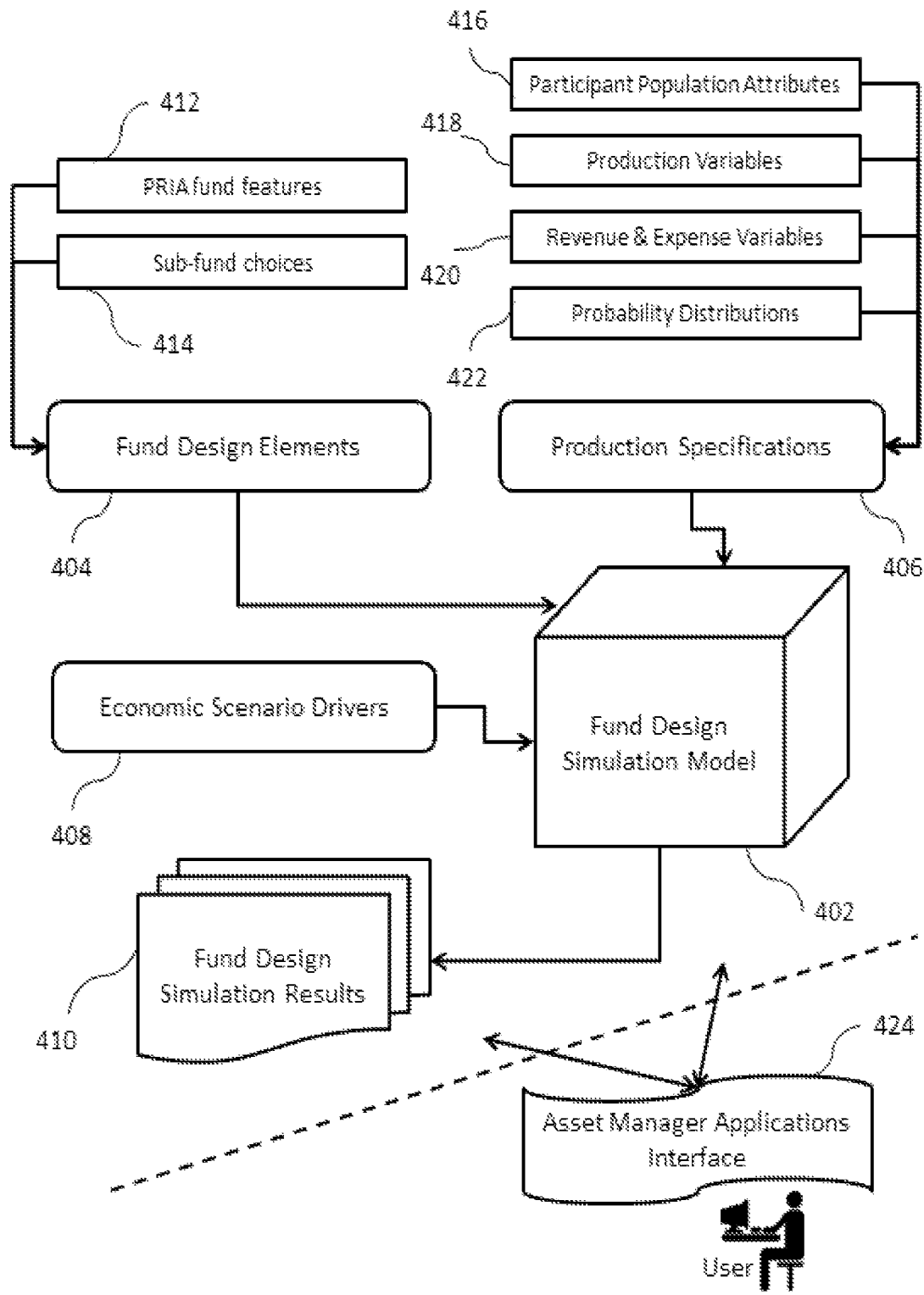
Figure 5:
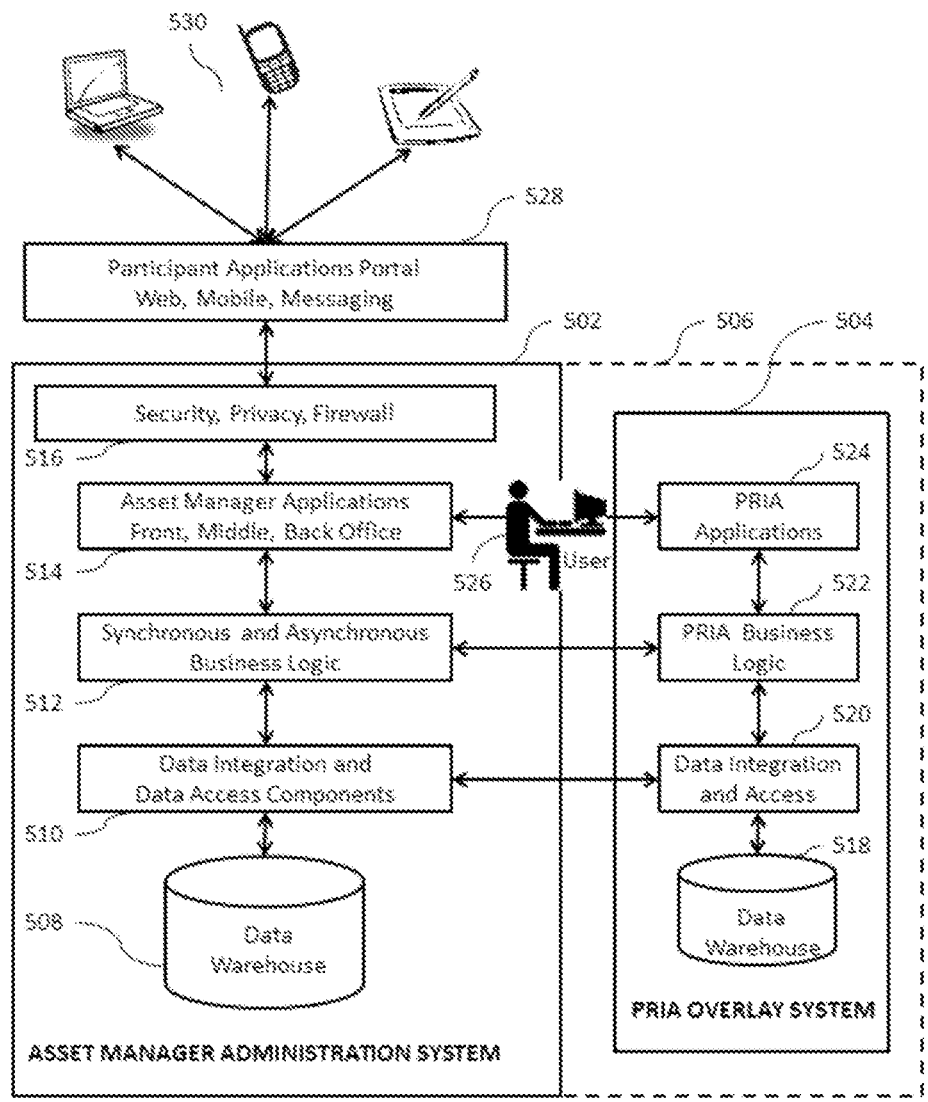
Figure 6:
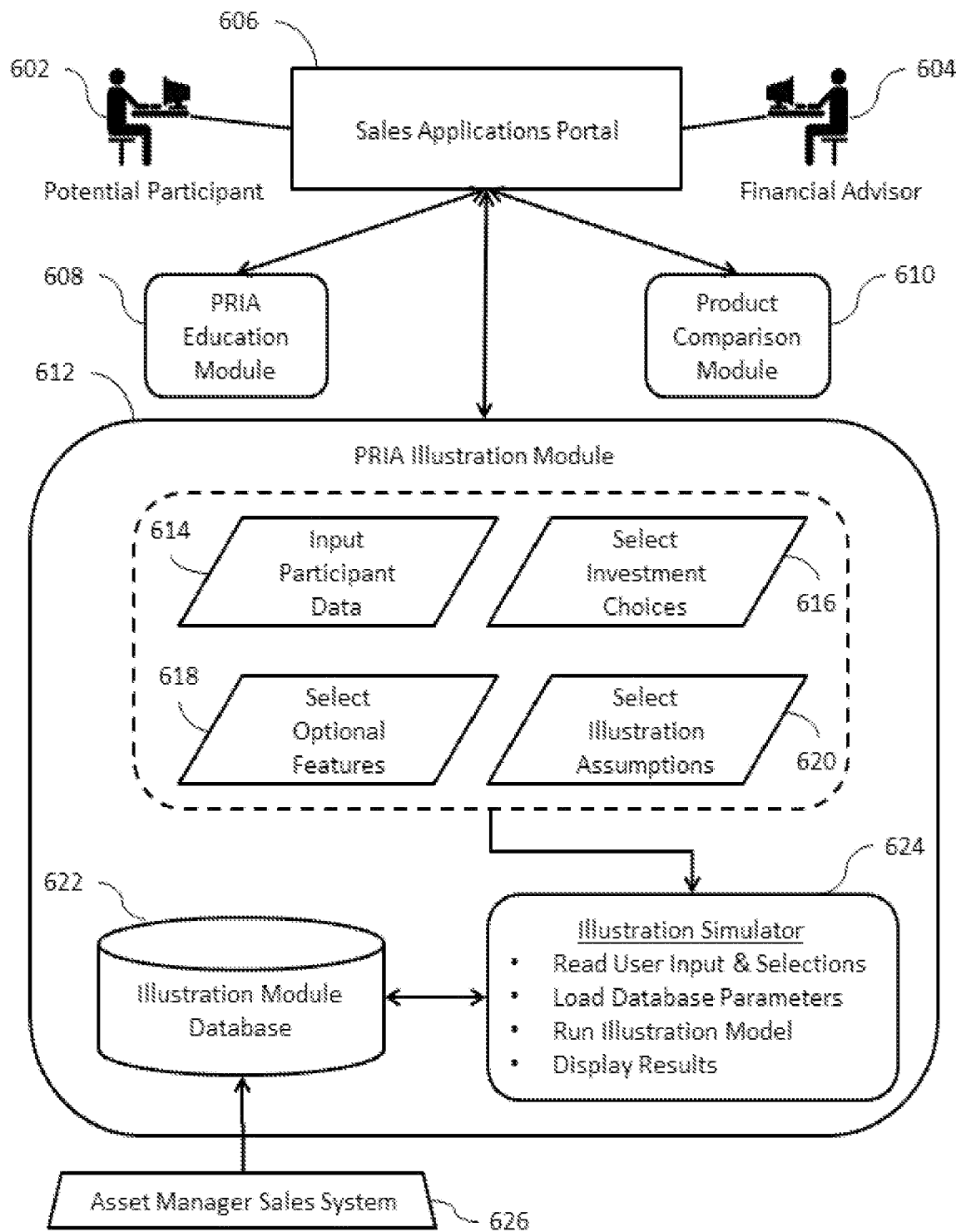
Figure 7:
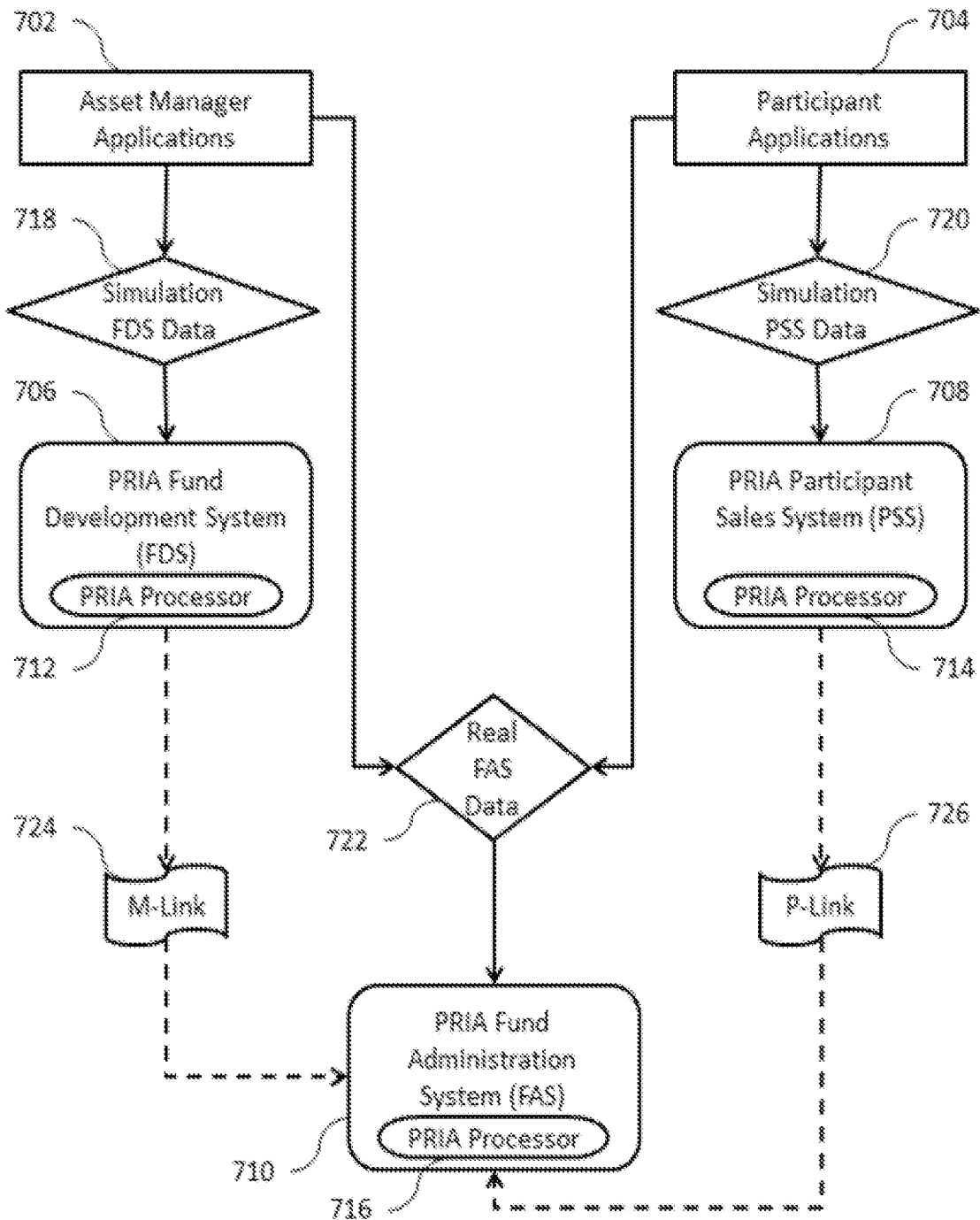
Figure 8:
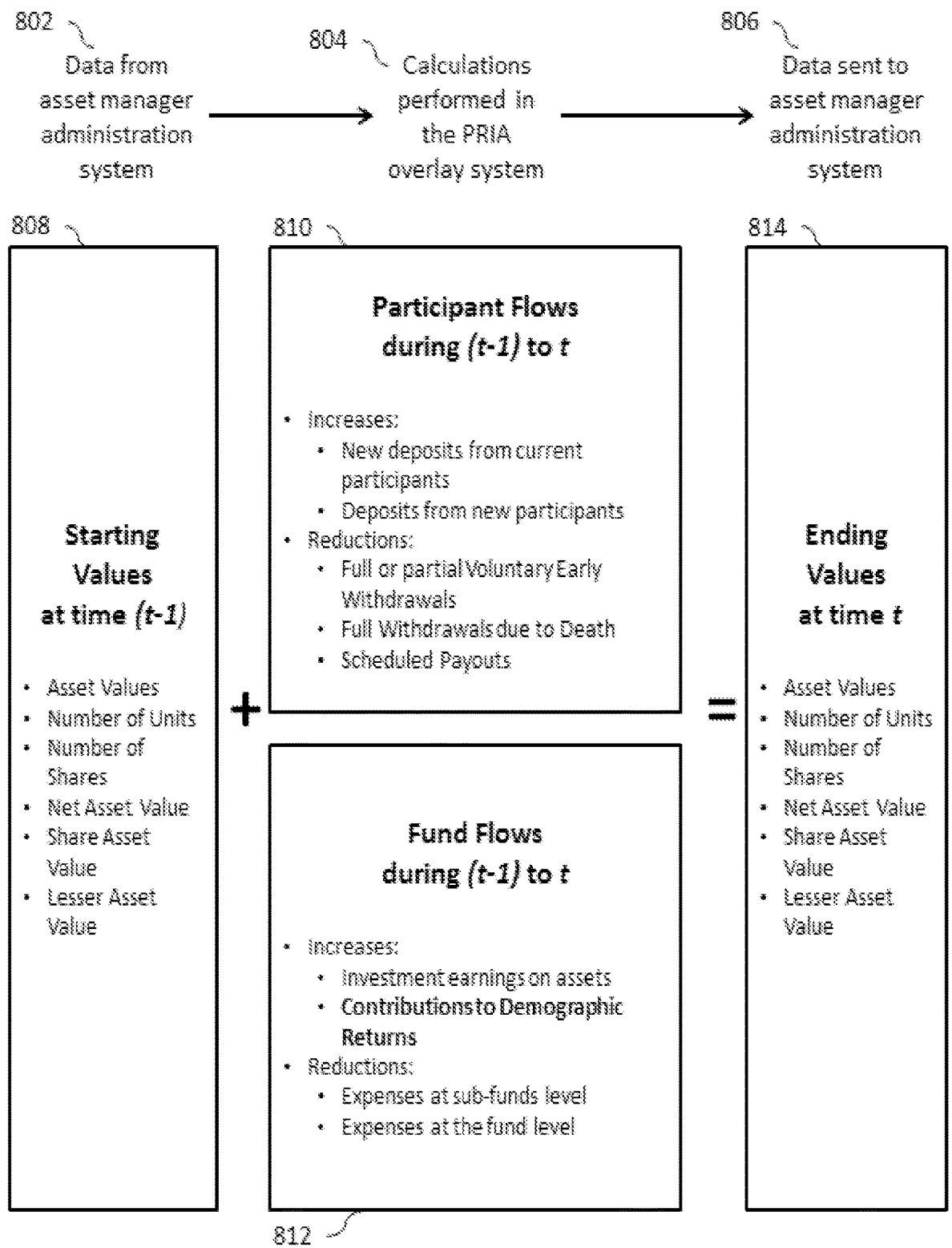
Figure 9:
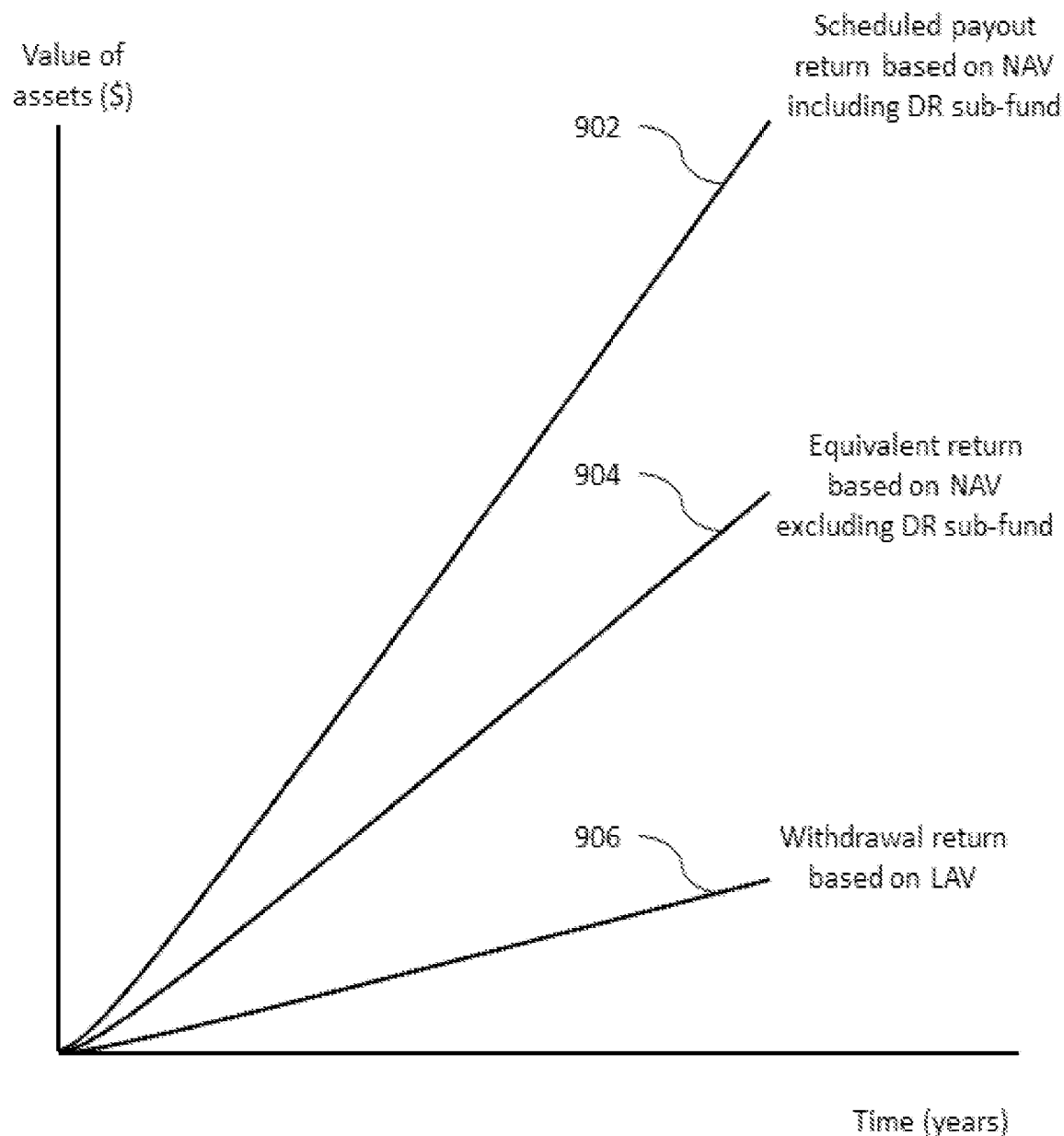
Figure 10:
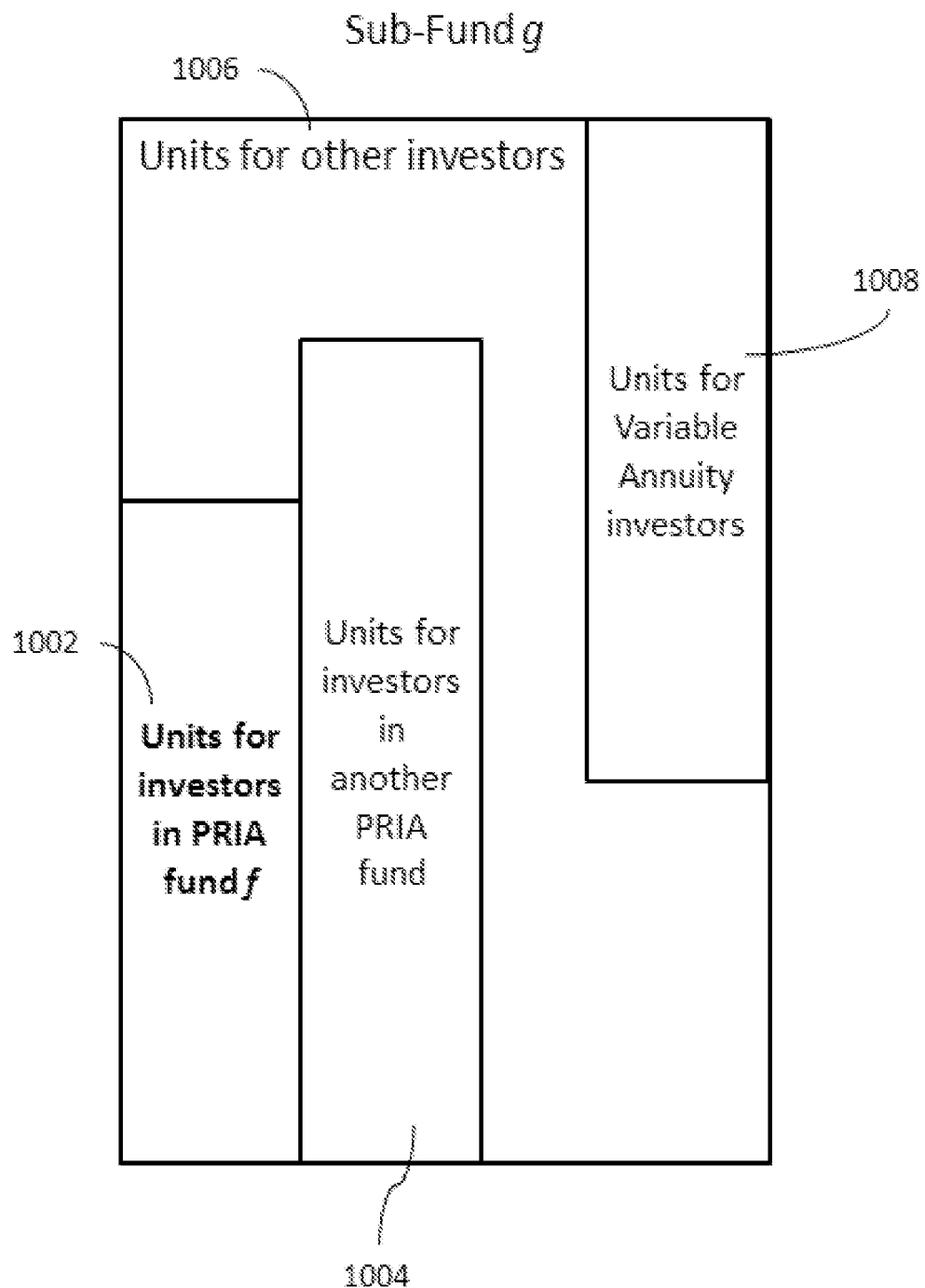
Figure 11:
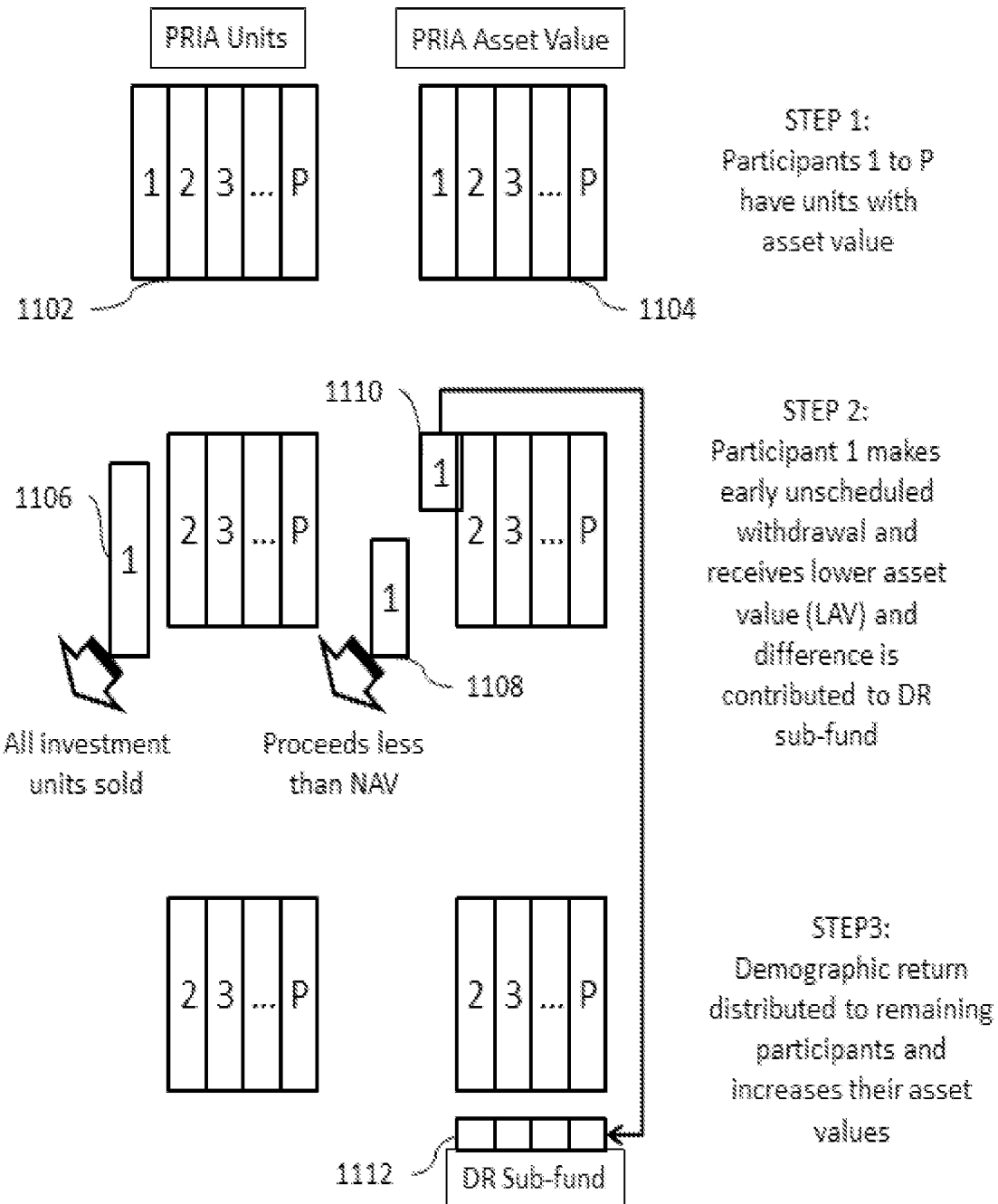
Figure 12:
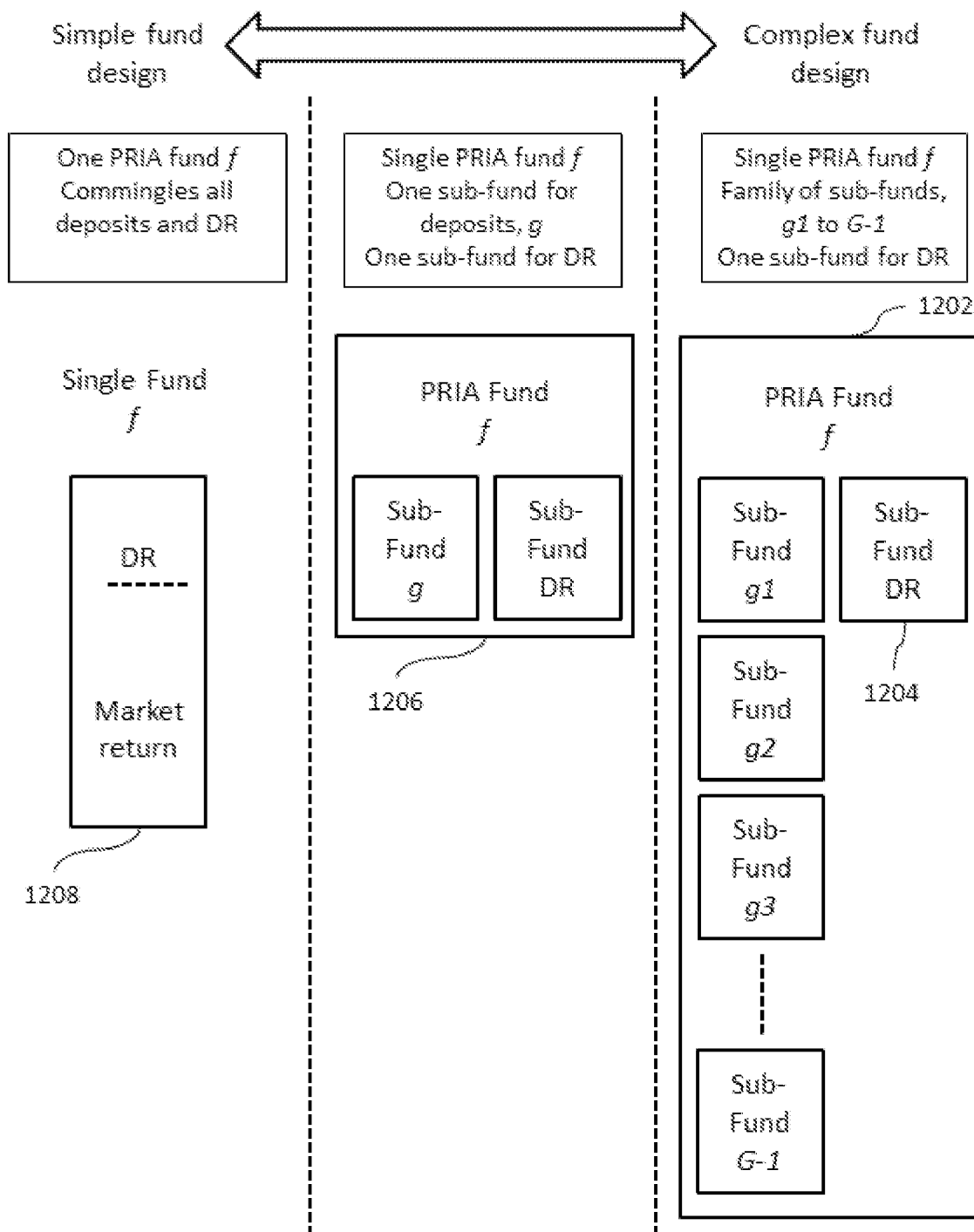
Figure 13:
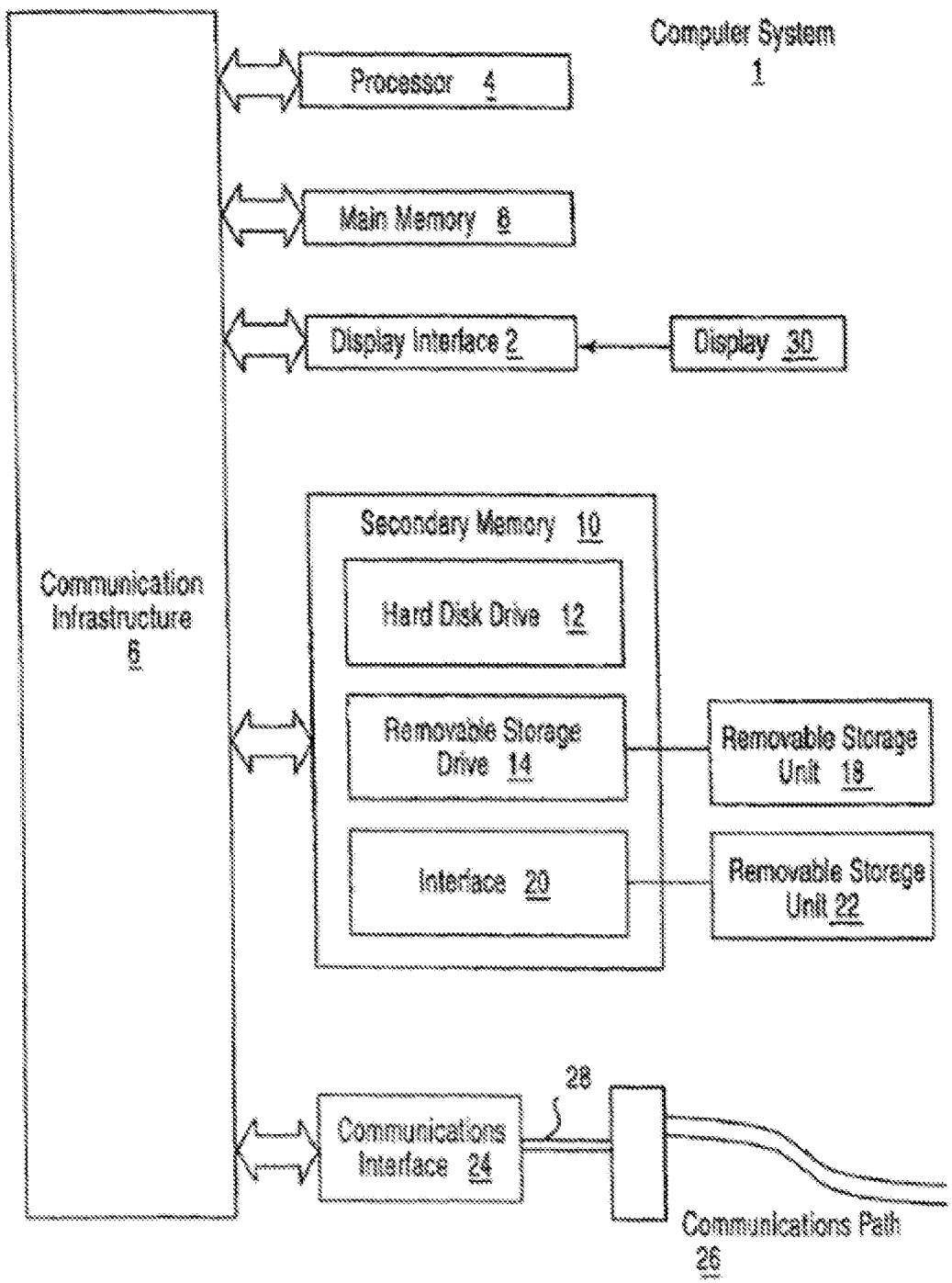

Having thus described preferred and exemplary embodiments of the present invention in general terms, reference will now be made to the accompanying drawings, which are not necessarily drawn to scale, and wherein:

FIG. 1 is a representation of the main objects and entities in the present invention showing a participant's ownership of a unit of assets in a PRIA fund offered by an asset manager, in accordance with one embodiment of the present invention;

FIG. 2 is a schematic flow diagram of an asset manager's process from designing a PRIA fund to its operation and ultimate closure, in accordance with one embodiment of the present invention;

FIG. 3 is a schematic flow diagram of a participant's process from learning about a PRIA fund to investing in it, and ultimately selling the investments and leaving the PRIA fund, in accordance with one embodiment of the present invention;

FIG. 4 is a schematic flow diagram of a PRIA Fund Design System, in accordance with one embodiment of the present invention;

FIG. 5 is a schematic flow diagram of a PRIA Fund Administration System as an integration of the Asset Manager Administration System and the PRIA Overlay System, in accordance with one embodiment of the present invention;

FIG. 6 is a schematic flow diagram of a PRIA Participant Sales System that includes an Illustration Simulator, in accordance with one embodiment of the present invention;

FIG. 7 is a schematic flow diagram that shows the three PRIA Software Systems accessed by Asset Manager Applications and Participant Applications, in accordance with one embodiment of the present invention;

FIG. 8 is a schematic flow diagram that illustrates the data flow between an Asset Manager Administration System and the PRIA Overlay System, in accordance with one embodiment of the present invention;

FIG. 9 is a diagram that illustrates the concept of the Demographic Return over time, in accordance with one embodiment of the present invention;

FIG. 10 is a schematic block diagram that illustrates that a Sub-fund can be used simultaneously and flexibly by a PRIA fund and other investor types, in accordance with one embodiment of the present invention;

FIG. 11 is a diagram that illustrates the concept of the Contribution to Demographic Returns, in accordance with one embodiment of the present invention;

FIG. 12 is a schematic block diagram that illustrates the range of designs for a PRIA fund, ranging from Simple to Complex, in accordance with one embodiment of the present invention; and FIG. 13 illustrates a block diagram with various computer system components for use with an exemplary implementation of a system for managing an investment fund having a demographic return feature, in accordance with one embodiment of the present invention.

DETAILED DESCRIPTION

Preferred embodiments of the present invention now will be described more fully hereinafter with reference to the accompanying drawings. The present invention can, however, be embodied in many different forms and should not be construed as limited to the preferred embodiments set forth herein; rather, these preferred embodiments are provided so that this disclosure will be thorough and complete, and will fully convey the scope of the invention to those skilled in the art. The present invention may be implemented with different combinations of hardware and software. If implemented as a computer-implemented apparatus, the present invention is implemented using means for performing all of the steps and functions described herein. The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately. It will be appreciated by those skilled in the art that changes could be made to the embodiments described herein without departing from the broad inventive concept thereof. It is understood, therefore, that this invention is not limited to the particular examples disclosed, but it is intended to cover modifications within the spirit and scope of the present invention as defined by the appended claims. For the purposes of exposition, one preferred embodiment of this invention is referred to as a Participating Retirement Investment Account (PRIA).

A PRIA fund is an open-ended investment fund offered by an asset manager to investors either through their retirement savings plans (known as qualified and non-qualified plans in the US), or individually (i.e., not as part of any retirement savings plan), that enables investors to participate in both market returns (without guarantees) and demographic returns. Any individual can join a PRIA fund and make deposits and withdrawals at any time, and there is no requirement for insurance-type underwriting based on age, gender or similar factor. Participants (investors) deposit money into a PRIA fund, and through it, into a choice of sub-funds (such as mutual funds) where their money is invested.

A participant earns a return from a combination of market performance of invested assets and demographic experience of the pool of investors. Market return is the change in the value of investments due to market dynamics, e.g., dividends, interest and capital gains and losses. Demographic return (DR) is the change in the value of investments due to the change in the demographics of their fellow investors.

Participants can sell their investments in each of the sub-funds that they own at any time. If the sale is based on a pre-arranged schedule (typically after many years when the participant is in retirement and needs money to cover living expenses), the participant receives a higher return, reflecting a combination of the market return and the DR.

However, if the sale is made voluntarily or upon an individual's death, the participant or beneficiary (in the case of death) receives a lower return according to a schedule defined by the asset manager.

The difference between the higher return and lower return is contributed to a DR sub-fund. All PRIA fund participants are credited with a proportional share of the DR sub-fund based on the amount of their total investment in the PRIA fund or some other determination. The DR sub-fund is managed by the asset manager and its investment strategy and performance will be described in a manner similar to other sub-funds offered to investors.

A PRIA participant is not charged any insurance-type premium and most likely does not receive any insurance-type benefit or guarantees. Such benefits and guarantees can be sold separately as an option to the participant, for a separate fee.

At the time of the initial deposit, the participant defines a period over which no scheduled payouts will be made, and another term over which investments will be sold per schedule to provide retirement income. Since all payouts will be made from the sale of invested assets (without guarantees), the asset manager will not be required to hold insurance-type reserves. To the extent that the asset manager offers additional features such as guarantees, those would be priced and reserved separately.

An automated feature can be included that monitors the data representing a current state of investments, participants, and participant demographics and applies a criteria to determine whether certain threshold (e.g., minimum threshold) is met. This ongoing process can run on the computer system and use the stored data to evaluate the state of the fund and commence a process to terminate and terminate the fund when one or more thresholds is not satisfied by the current data. This may be performed after an initial inception period for instituting the fund and therefore, the fund can be terminated for example because the system determines the number of participants fell below the threshold or the amount of invested funds is insignificant.

PRIA Objects.

Referring to FIG. 1, showing a participant's ownership of a unit of assets in a sub-fund of a PRIA fund offered by an asset manager, these main objects and entities are defined as follows:

An Asset Manager, m, 102 is an asset management company (including a bank or insurer) that offers multiple PRIA funds 104. In the marketplace, there may be several asset managers, designated by the variable in where in ranges from 1 to a maximum number of M asset managers.

A PRIA Fund, f, 104 is a pooled investment fund offered by the asset manager 102 through which a Participant 110 aggregates investments in multiple sub-funds, g, 106. An asset manager may offer several PRIA funds, designated by the variable f, where f ranges from 1 to F, the maximum number of PRIA funds offered by a single asset manager. In this embodiment, the convention that the PRIA fund is a means to organize all the sub-funds that make investments is used, and that the PRIA fund does not make any investments directly itself. In alternative embodiments, the PRIA fund can also make direct investments itself. In another embodiment, the PRIA fund and its sub-funds are combined so that there is only one fund in which the participants make deposits and that same fund makes investments directly. These are all variations on the preferred embodiment, which will be used to describe the invention.

A Sub-Fund, g, 106 is a member of the family of investment choices available to a participant 110 under a PRIA fund, f, 104. A PRIA fund may offer several sub-funds, designated by the variable g where g ranges from 1 to G, the maximum number of sub-funds offered under a single PRIA fund. A sub-fund can be any investment vehicle offered by the asset manager. For example, it can be an investment fund such as a mutual fund in which a professional portfolio manager purchases several investments on behalf of investors in that mutual fund, or it can be a single security, such as publicly-listed shares of a corporation. Since a sub-fund can be offered by more than one PRIA fund 104 of an asset manager 102, it is important to state both f and g when referring to a sub-fund.

A Participant, p, 110 is a customer of the asset manager 102 who can invest initially and subsequently on multiple instances over time in any PRIA fund 104 and its sub-funds 106 offered by an asset manager. A participant may invest in a PRIA fund through mechanisms where such an investment opportunity is available. For example, in the US, a PRIA fund may be available to a participant through a corporate retirement plan, a rollover into a qualified Individual Retirement Account (IRA), a non-qualified plan, or outside any qualified retirement plan. A participant may invest with the assistance of a Registered Investment Advisor (RIA), another investment advisor, or without such assistance.

A Lot, q, 112 is a unique investment made by participant, p in fund, f's sub-fund, g that differs from another investment made by the same investor in the same sub-fund of the PRIA fund by at least one parameter. Most commonly, this parameter is the date on which the investment is made, although the number of units purchased and the amount deposited could be different as well. If another differentiating parameter is available, then lots may be distinguished by different values of such a parameter. Among other information, a lot may identify the date of investment; the number of units initially purchased and the purchase price; the number of units that may have been sold and the dates of sale and price at which they were sold; and number of units currently owned and the current value of those units. A participant may acquire multiple lots in the same sub-fund of a fund, designated by the variable q, where q ranges from 1 to Q. At any time, the sum of units and the sum of values of all lots in a sub-fund may describe a participant's total investment in that sub-fund, and the sum of values across all sub-funds describes a participant's total investment in that PRIA fund.

A Unit, U, with Asset Value, A, 108 is the most granular representation of ownership interest in a sub-fund by a participant. Specifically, the variable U(p,q,f,g,t) is the most granular object defining the number of units owned by a participant, p, 110 through an investment lot, q, 112 in sub-fund, g, 106 of a PRIA fund, f, 104 offered by an asset manager, m, 102, at time t, with an asset value of A(p,q,f,g,t). Embodiments of the present invention may generate and store ownership data that identifies ownership stake generated from the use of the investment contribution deposit for each participant in an investment vehicle available in the investment fund. Embodiments of the present invention may also implement a structure that governs the operation of a demographic return fund as part of the investment fund. Embodiments of the present invention may also generate and store additional ownership data that creates ownership in the demographic return fund as part of the investment fund, wherein the system is configured to create the demographic return ownership units for each participant in the investment fund by a specific formula.

With these definitions of the primary objects of this invention, next the business systems, apparatus and media are described. The methods and calculations embodied therein and utilizing the objects defined above will be described thereafter.

PRIA Processes and Systems.

The prior art consists of asset managers who offer conventional investment funds, as described earlier in the Background. For the purposes of describing the invention, it is assumed that one such asset manager decides to offer a PRIA fund as well. It is therefore assumed that the asset manager has all the methods, systems, apparatus and media to implement the conventional investment fund offerings to investors, and that the PRIA fund method, system, apparatus and media are added as an "overlay" on to those. In this context, an overlay signifies an innovation that is implemented as an addition that improves upon the prior art. An alternative embodiment would assume that the asset manager is new and, therefore, would have to build a completely new set of method, system, apparatus and media to offer a PRIA fund to investors. In that case, there will be components that reflect the prior art of offering conventional investment funds and components that reflect the overlay necessary to offer a PRIA fund.

FIG. 2 represents the process for an asset manager who wishes to offer a PRIA fund to its investors. The first step of the process is to customize the PRIA fund design 202. In this step, the asset manager would use a PRIA Fund Design System represented in FIG. 4 to select PRIA fund features that would be of interest to its customers. These features relate to the PRIA object attributes described earlier, as well as rules that an asset manager specifies for certain actions that a participant or the asset manager may take. For example, the asset manager can require minimum and maximum initial deposits, minimum and maximum subsequent deposits, minimum and maximum early withdrawals, minimum and maximum period before payouts commence, minimum and maximum period over which payouts are completed, minimum and maximum amount of scheduled payouts, and formulae for Lower Asset Value (LAV) calculation.

The asset manager would establish launch criteria in order to offer a PRIA fund. Examples of such criteria are, the minimum expected amount of deposits over a defined time period, and the minimum number of participants at launch. Once the PRIA fund design has been selected, the asset manager would check if its launch criteria have been met 204. If they have not, the asset manager may choose to end the process or to redesign the PRIA fund features and try again. If the launch criteria have been met, the asset manager would move to the next step and initiate the PRIA fund launch process 206. A launch process would be consistent with launch processes for other conventional investment funds. Examples of launch process steps include preparing the administration system to track and report on all invested assets, recruiting and training marketing staff, preparing sales materials, and obtaining all internal and external approvals.

An asset manager may require a participant to specify a payment schedule. The payment schedule may include defining a table of dates and units to be sold (e.g., percentage of total, certain number of units, or a certain number of dollar-equivalents). For example, a payment schedule could be a sale of 50% of units on Jun. 30, 2015, and the rest of the units on Jun. 30, 2025. At the first date, the participant may conclude that they do not really need all of that money, so the participant may prefer to take less, e.g. 30% of units. The participant could be forced to take the full 50% and then they could deposit 20% back, which would be treated as a new deposit. Alternatively, the asset manager may permit the withdrawal of only 30%, and allow the individual to defer the sale of the remaining 20%. For the remaining 20%, there may be a variety of choices available to the participant. For example, the participant may have the option to take the 20% at any time in the future without penalty or take the 20% at some specified dates in the future (i.e., update the payment schedule) with the consequence that there may be a penalty on early withdrawal or upon death. Alternatively, if the participant wants to take out more than 50% on the first payment date, they may be able to but the excess may be treated as an early withdrawal.

A payment schedule may be modified from time to time as permitted by the asset manager or administrator. For example, every 5 years or once a large deposit has been made or may be some other rule. This feature recognizes that a participant's needs may change over time. However, the asset manager may not allow the participant to modify the payment schedule at any time, since the participant may have the ability to make an early withdrawal without having to modify the schedule. The payment schedule may also require a minimum period of time before any payments can be made to the participant. So even if the schedule may be modified, it may only apply after the payment schedule start date. The payment schedule may also require a minimum number of scheduled payments. For example, the rules may specify that payments can be taken annually, quarterly, monthly or some other frequency allowed by the fund's rules. A participant may be given the option to take less than the scheduled payment amount on any particular payment date. In that situation, the fund's rules would define how the difference between the scheduled amount and the amount actually paid out is treated. For example, the difference could be withdrawn at full value by the participant at a later date after the scheduled payment date. Alternatively, the difference may be deferred to other specified payment date(s), and any early withdrawals from those payment dates could be considered early withdrawals. A participant may be given the option to make a certain number of unscheduled withdrawals for a defined part of their holdings at full value. For example, two unscheduled withdrawals, where each withdrawal is less than 10% of their full account value, may be withdrawn at any time at full value. In this situation, other unscheduled withdrawals would be paid out using the LAV. A participant may be charged fees by the asset manager for some of the modifications or unscheduled withdrawals described above, at the time such actions are taken. It is understood by those of ordinary skill in the art that the system implements such features using interactive functionality such as by generating an interactive display resulting from signals (which can be packets or messages) that are sent to mobile apps, browsers, or other software on a client device. The interface in this case will allow the relevant interactivity that allows the client to, for example, modify the schedule or percentages.

The asset manager may establish sales criteria in order to initiate starting a PRIA fund and offering it to investors. Examples of sales criteria include recruiting a minimum number of sales outlets (e.g., brokers and other intermediaries) to offer the fund, and obtaining a minimum level of investor interest in the fund, both in terms of the number of participants and the amounts to be invested. During the launch process, the asset manager may check if the sales criteria 208 have been met. If they have not, the asset manager can choose to end the process or go back and redesign the product. If the sales criteria have been met, the asset manager would move forward and start the PRIA fund

210. This entails putting all the components in place to start taking deposits and to run and administer the PRIA fund.

Once the fund is started, the asset manager would operate the PRIA fund 212. This may involve taking deposits, allocating those deposits into sub-funds as directed by each participant, crediting market returns from the growth of investments due to dividends, interest and market value changes, crediting demographic returns based on the demographic experience of investors in that PRIA fund, deducting fees and expense charges, and paying out proceeds from the sale of investments in sub-funds as scheduled or as directed by investors either voluntarily (early withdrawal) or involuntarily (upon death). To administer the PRIA fund, the asset manager would use a PRIA Fund Administration System represented in FIG. 5.

The asset manager would have established a minimum threshold criteria above which the PRIA fund would continue to operate and below which the PRIA fund would be closed. Examples of such criteria are a minimum amount invested in the funds, a minimum number of participants in the fund and an acceptable level of inflows and outflows to and from the fund. The asset manager regularly monitors and checks if the operating criteria have been met 214. If the criteria are met, the asset manager would continue to operate the PRIA fund. If the criteria have not been met, the asset manager would close the PRIA fund 216 by selling all remaining investments and paying out all remaining investors in a manner established by contract (e.g., described in the PRIA fund prospectus or offering document) at the inception of the PRIA fund.

FIG. 3 illustrates the process for a participant who invests in a PRIA fund. As a first step, an individual would receive information about investing in a PRIA fund 302 from various formal and informal sources, for example a Registered Investment Advisor (RIA), another investment advisor, an asset manager, a corporate retirement plan sponsor, the internet, or other sales channels 304. Based on that information, the individual can decide if they are interested in investing in the PRIA fund product 306. If they are not interested, they can stop the process there. If they are interested, they can get further information and review sales materials and illustrations 308. This review would be aided by a PRIA Participant Sales System, illustrated in FIG. 6.

The individual would have developed some formal and informal investment criteria, which would be used as a basis for making a decision for investing in a PRIA fund. For example, the individual may have a target amount of wealth that they would like to build over some defined period, and a minimum cash flow that they need to generate in their retirement years. The individual would have to decide if their investment criteria are met 310. If the investment criteria are not met, the individual can stop the process there. If the investment criteria are met, the individual, or an investment intermediary acting on behalf of the individual, will use the asset manager's administration system illustrated in FIG. 5 to select the various fund options offered by the asset manager 312. Once the options are selected, the individual becomes a participant by making a deposit and investing in the PRIA fund 314. In conjunction with making a deposit, the participant may also provide personal information, such as name, address, demographics, or other information. The system may also be configured to receive and store such personal information. In alternative embodiments, an asset manager may offer alternative mechanisms for making an investment. For example, the individual can fill in an application form and a deposit form manually, and an employee of the asset manager can manually process that information. In all cases, an individual's application and deposit information would be input ultimately into the asset manager's administration system illustrated in FIG. 5.

Next, the system may create an individual account for each participant, where the accounts may be available to be created in the same investment fund for participants that are in multiple diverse classifications. For example, a female in her 30's with no history of smoking could be an example of three different types of classifications: gender, age and health. An account creating interface may be utilized to allow participants to self-select a start date and payment schedule for a liquidation phase of their account. The self-select start date may be configured to begin immediately or at some time in the future. The system may be configured to receive and store principal data that identifies one or more investment contribution deposits made by each participant into the fund. Additional ownership data may be generated and stored by creating ownership in the demographic fund as part of the investment fund. The system may be configured to create the demographic return ownership units for each participant in the investment fund by a specified formula.

The participant would utilize the user interface of the asset manager's administration system to track their activities and the value of their investments in the PRIA fund. The investment balance in the fund would be calculated on a regular (e.g., daily) basis and would show, among other information, the deposits that were invested, net of any sales, the market returns and demographic returns earned, and the fees charged 316. The investor can check if the value of their investments is positive 318. If the PRIA fund balance is not positive, then the participant has zero balance either through sale of investments or extraordinarily negative market returns, which terminates that PRIA fund participation.

If the PRIA fund balance is positive, the participant can decide whether to take any further actions. If no action is taken, the participant simply continues with their participation in the PRIA fund 322. If an action is taken, then those would be one of two types. First, the investor can opt to make an additional deposit 324. In that case, the process would be the same as making an investment in a PRIA fund 314 described earlier. Second, the investor can opt to sell investments 326.

A third action, transfer between sub-funds, is available to the participant but not reflected in FIG. 3, since it does not remove assets from the PRIA fund, except for any fees that may be charged for that action. Therefore, excluding any fees, there is no impact on the total assets owned by the participant, including their units owned in the DR sub-fund, for such an action. In this embodiment, transfers in or out of the DR sub-fund are not allowed, since those units are earned over time and cannot be purchased. In an alternative embodiment, the asset manager can set rules on transfers in or out of the DR fund, and possibly purchases of units in the DR fund. The asset manager is likely to impose rules on transfers between funds, for example on the frequency of transfers between funds over a certain period, or the amount of funds that can be transferred at any time.

On the sale of investments, specific units owned by the participant in each of the sub-funds are sold at full value (i.e., at Net Asset Value, NAV). Before determining how much is actually paid to the participant on that sale, the asset manager has to determine whether the sale is a scheduled sale 328 (i.e., for an amount from zero to the maximum amount specified, and at a date contracted by the participant) or an unscheduled sale (i.e., either a voluntary withdrawal by the participant, or an involuntary withdrawal due to death of the participant). If it is a scheduled sale, then the participant receives proceeds based on the full Net Asset Value of their investments 330, less any fees that the asset manager may impose at that stage. If it is not a scheduled sale, then the proceeds would be based on a Lower Asset Value (LAV) as determined under the PRIA fund rules 332, also net of any fees that the asset manager may impose at that stage. In that case, the difference between the full asset value based on NAV and the lower value based on the LAV, defined as the Contribution to the Demographic Return 334, is deposited by the asset manager back into the PRIA fund 314; the asset manager makes the investment into the DR sub-fund for the benefit of all remaining participants. In the event of a participant's death, the entire portfolio of PRIA fund holdings, including their share of the DR sub-fund, is sold. On the other hand, in the event of a partial withdrawal, only the designated part of the PRIA fund holdings is sold, and the participant continues to be entitled to a proportionate share of the DR sub-fund based on their remaining investment holdings. A client life status interface may be implemented so that a participant's death may be reported to the system.

Computer-Implemented Software Systems.

Having described the major methods, systems and processes from the perspective of an asset manager and an individual participant, the enabling software systems mentioned earlier will now be described in greater detail. There are three software systems that are described independently herein. The present invention is not limited to only three software systems. There may be more systems that work together or the systems may be combined and implemented together. Each can be implemented as described or in alternative embodiments that deliver essentially the same functionality, information, calculations and reports. These alternative embodiments may combine some of the component elements of the software systems or implement them as disaggregated modules.

The unique aspect about all three of these software systems is that they embody the methods, processes, data requirements and calculations required to implement any embodiment of the invention. Two of the software systems use some simulated data in order to perform their function, but the core PRIA data requirements and calculations are essentially the same for all three software systems. For the purposes of exposition, the three software systems are described first, followed by a description of the PRIA data requirements and calculations that are embedded within each of them.

FIG. 4 describes the PRIA Fund Design System (FDS). The FDS is a software implemented system that is used by an asset manager in several ways to simulate the potential future evolution of a PRIA fund under a variety of scenarios and over a range of time horizons. The core analytics of the FDS is the Fund Design Simulation Model (FDSM) 402. The FDSM is a computer-enabled software program that reads inputs provided by an asset manager and produces output displaying results of the simulation. The calculations performed by the FDSM are described below.

There are three categories of inputs into the FDSM. The first is the Fund Design Elements (FDE) 404, the second is the Production Specifications (PS) 406 and the third is the Economic Scenario Generator (ESG) 408. There is one broad category of output, the Fund Design Simulation Results (FDSR) 410, that displays all the results that an asset manager will use in making decisions about a PRIA fund.

The Fund Design Elements 404 has two core modules. The first is the PRIA Fund Features (PFF) 414. This module enables an asset manager to customize a PRIA fund by selecting and specifying several alternative PRIA fund features that are available in the FDE 404. In its simplest embodiment, the PFF 414 provides a menu of choices for an asset manager to select from, and the asset manager can specify choices within allowable ranges of values for these features. In another embodiment, the PFF 414 could also allow an asset manager to add new features and also to add customized software code to the FDSM to capture such features. Examples of PFF are described above.

The second module of the FDE 404 is the Sub-fund Choices 414 module. In this module, an asset manager selects from a menu of sub-funds that it wants to include in the PRIA fund that will be offered to participants. The menu of sub-funds can include those investment choices that the asset manager has previously established, for example a currently-offered mutual fund, or a new investment choice that it may be interested in setting up, for example a mutual fund that has a new investment strategy. Upon selection of the sub-funds from the menu, the data regarding the characteristics, historical performance of those sub-fund, and drivers of future performance will be loaded from the asset manager's own database or a third-party database that offers such information. If such data is not available from those sources, the Sub-fund Choices 414 module can be implemented with those components stored and retrievable in that module using some combination of historical data and simulated data.

The Production Specifications 406 has four core modules. The first module is the Participant Population Attributes (PPA) 416. In this module, an asset manager inputs the attributes of the population of potential investors in the PRIA fund that is being designed. These attributes represent participants who join at the inception of the fund and those who join at later dates considered by the FDS 402. The attributes are sufficiently well-defined to enable the asset manager to assess the simulation results as different attributes are tested. These attributes are a combination of the information that an individual participant would provide when making deposits in a PRIA fund and the data necessary to simulate their demographic experience over time. In a simulation, these attributes can be applied at both an individual level as well as at a cohort or population level. For example, participant mortality and withdrawal experience would be specified, most likely by referring to actuarial tables for annuitants who are likely to exhibit similar demographic characteristics as PRIA fund participants. The volume of participants joining in each year of the simulation would be specified, together with assumptions about age and gender distributions.

The second module of the PSS 406 is Production Variables (PV) 418. In this module, an asset manager can specify variables that define the business of running a PRIA fund. Examples of such variables are the number of years that the fund would run, and the number of years to run the simulation.

The third module of the PSS 406 is the Revenue and Expense Variables (REV) 420. In this module, an asset manager tracks its own revenues and expenses as a result of offering the PRIA fund being designed. The asset manager can include a full financial statement in the REV module or simply track certain revenue and expense items, which would then be used in other asset manager software applications to assess profitability of the PRIA fund business.

The fourth module of the PSS 406 is Probability Distributions (PD) 422. In this module, an asset manager can specify the probability distributions for any parameters and variables that are subject to dynamic simulations requiring such an input. For example, mortality tables and withdrawal probability distributions would be used to generate the level of persistency in the PRIA fund, i.e., the proportion of participants who continue to invest in the fund from one period to the next.

The Economic Scenario Drivers (ESD) 408 is a module that specifies the economic conditions in simulated future scenarios and time horizons in which the PRIA fund being designed is tested. The prior art consists of many commercially available Economic Scenario Generators that can be used by a skilled practitioner to produce the data necessary for the ESD. Simpler ESDs use deterministic scenario paths where economic parameters are specified explicitly and remain unchanged during the simulation. More complex ESDs use economic parameters that are variable and path-dependent, and are recalculated at each period along a scenario path. The economic parameters are also quite varied, and the asset manager should choose an ESD that has a high degree of relevance to the sub-funds that they intend to offer.

Given the inputs from the FDE 404, PS 406 and ESD 408, the FDSM 402 performs its calculations. The Fund Design System Reports FDSR 410 produces the resulting output of the FDSM 402. The output is displayed on a computer screen, printed on paper or otherwise delivered to the asset manager using the FDS. All the components of the FDS are available to an asset manager through an Asset Manager Applications Interface 424, through which a user can input data, run simulations, and retrieve and review results.

The FDS can be used by an asset manager in several ways. For example, the asset manager can use it to create and test the design of a PRIA fund that they will ultimately offer to its customers. In another application, once a PRIA fund is launched, the asset manager can use the FDS to simulate the future performance of that fund under various future scenarios and time horizons. The results of the simulation can be used by the asset manager in several ways, for example, for internal expense budgeting purposes and for its own corporate financial projections. In a third application, also once a PRIA fund is launched, the FDS can be used by the asset manager to evaluate and decide on actions that they may be able to take to modify some of the features of the PRIA fund, as allowed by the PRIA fund rules. For example, the FDS can help assess the impact of replacing one sub-fund choice with another sub-fund choice.

FIG. 5 describes the PRIA Fund Administration System (FAS). The FAS describes a computer-based software system that an asset manager would implement to sell and administer any PRIA fund that it offers to participants. The FAS consists of the Asset Manager Administration System (AMAS) 502 and the PRIA Overlay System (POS) 504.

In some embodiments, a newly-invented PRIA Overlay System (POS) 504 is implemented as an overlay that is integrated in parts or as a whole with the AMAS 502. FIG. 5 illustrates a configuration 506 where the entire POS 504 sits within the Security, Privacy and Firewall 516 environment of the AMAS 502, and there are multiple interfaces between them. Other configurations are possible that achieve the same function of the preferred embodiment, for example where none or only certain parts of the POS 504 sit within the AMAS 502 environment, with the appropriate security, privacy and firewall considerations installed. Such alternative configurations and computer systems that achieve the same functionality should be considered within the scope of this invention.

The AMAS 502 consists of several media, modules and interfaces. A Data Warehouse 508 contains all the static and dynamic data that is required to appropriately administer an asset manager's operations. The Data Integration and Data Access Components 510 is the module that controls the input and output into the Data Warehouse 508, whether that data is sourced within the asset manager's own environment, i.e., AMAS 502, or from external sources. Within the asset manager's business environment, several Asset Manager Applications for Front, Middle and Back Office 514 are available to users to manage all its day-to-day operations. These applications access information stored in the asset manager's Data Warehouse 508 via the Synchronous and Asynchronous Business Logic 512 that manages such communication through business rules (describing specific procedures) and workflows (containing the tasks, procedural steps, required input and output, and the tools needed in each step). The Data Warehouse 508 may provide the functionality to receive and store personal information about the participants, principal data, ownership data and any other relevant data that needs to be stored and retrieved.

The PRIA Overlay System 504 contains all the data, business logic and applications that, together with the data and applications provided by the AMAS 502, uniquely facilitates and enables the day-to-day administration of a PRIA fund, specifically by performing the calculations related to participant actions, DR sub-fund dynamics and other demographic-related data. The POS 504 has a similar structure to the AMAS 502. The POS Data Warehouse 518 contains all the static and dynamic data required to appropriately manage a PRIA fund. The POS Data Integration and Access 520 module controls the input and output into the POS Data Warehouse 518. The PRIA Business Logic 522 manages the communication and business rules between the PRIA Applications 524 and the Data Warehouse 518. The PRIA Applications 524 performs the PRIA fund calculations and provides information to the asset manager that can be used for both internal and external communications and reporting, that will be described later in this document.

The POS 504 may be configured to provide an interactive application that processes a structure for the operation of the investment fund, which includes handling interactions with potential participants, participants and administrators. The POS 504 may also be configured to register participants in the fund, receive and store personal information about the participants and create individual accounts for the participants. Further, the POS 504 may also be configured to provide an account creation interface, receive and store principal data and ownership data. Also, the POS 504 may be configured to implement the structure that governs the operation of the demographic return fund. The POS 504 may also provide an account value interface through which the computer system interacts with other computer systems to receive and provide information about the current value to fund participants. The current value may contain a current value of the investment contribution of that participant in the investment vehicle incorporating market returns and a current value of the demographic return ownership units of that participant. The POS 504 may also provide a client life status interface so that a participant's death may be reported to the system.

There may be several interfaces between the AMAS 502 and the POS 504, as signified by the arrows that connect the Applications (514 and 524), Business Logic (512 and 522) and Data Integration and Access (510 and 520) modules in FIG. 5. One or more designated Users 526 in either or both of the AMAS and the POS systems are given access to the PRIA fund-related modules and applications so that they can appropriately manage the administration of a PRIA fund.

Outside the Security, Privacy, Firewall 516, the asset manager's Participant Applications Portal (PAP) 528 will facilitate communication with participants via the internet (web), mobile, messaging and other software applications technology 530. The PAP 528 may also be referred to as the interactive application, which also may include the account creation interface, the account value interface, a withdrawal interface, a client life status interface, a demographic return account value interface. The PAP 528 is part of both A MAS 502 and POS 504 since it has both conventional investment management applications as well as PRIA fund management applications. It is the interface through which an individual participant and/or their designated financial representative can initiate participation in a PRIA fund, monitor their investment profile and performance at any time, communicate electronically with the asset manager, and perform any calculations that the asset manager makes available through that portal.

As indicated above, alternative configurations and computer systems that achieve the same functionality should be considered within the scope of this invention. For example, in an alternative embodiment, the PRIA Fund Administration System is designed so that the functionality of the PRIA Overlay System 504 is fully contained and integrated within the Asset Manager Administration System 502. There would be one Data Warehouse 508 that includes all the data fields and relationships in the POS Data Warehouse 518; one Data Integration and Data Access Component 510 that includes all the functionality and components of the POS Data Integration and Access 520; one Synchronous and Asynchronous Business Logic 512 that includes all the functionality and elements of PRIA Business Logic 522; and one Asset Manager Applications 514 that includes all the functionality, programs, interfaces and relationships of PRIA Applications 524. Other embodiments could have some components fully integrated as just described, while others components are modularized as reflected in FIG. 5.

FIG. 6 illustrates a PRIA Participant Sales System (PSS). The diagram shows an embodiment of a Sales Applications Portal (SAP) 606, a web-based computer-implemented software interface, that a potential participant 602 would use to learn about and ultimately decide whether or not to invest in a PRIA fund. The same Sales Applications Portal 606, or a customized version, would also be used by their Financial Advisor 604. As noted earlier, the Financial Advisor 604 is meant to signify any intermediary through which the potential participant learns about a PRIA fund investment, for example a Registered Investment Advisor, or a corporate retirement plan sponsor.

The Sales Applications Portal 606 can have several modules that help the potential participant 602 learn about the PRIA fund product, show illustrations about how the product works, and compare it to other products. In the illustrated embodiment, three modules are shown that do this, although other modules can be added to alternative embodiments that show essentially the same information to the potential participant.

The first module is the PRIA Education Module 608. This module provides a description of the PRIA fund product and its various features, and how it fits within an investor's financial planning portfolio. The second module, the PRIA Illustration Module (PIM) 612, described below, is used to show a potential participant 602 the risks and rewards of investing in a PRIA fund based on specific inputs by that individual. The third module is the Product Comparison Module 610 that enables a potential participant 602 to compare various PRIA funds and other investment choices in general descriptive terms or with detailed numerical analysis.

The PIM 612 enables a potential participant to input some information and run a simulation program that produces output that they can use to illustrate the economics of investing in a PRIA fund. The core software process of the PIM 612 is the Illustration Simulator (IS) 624. The IS reads input provided by the potential participant 602 or their financial advisor 604, loads parameters from the Illustration Module Database 622, and generates results that are displayed on the Sales Applications Portal 606 computer screen.

There are four steps that a participant or financial advisor may take to input data to the IS. First is to Input Participant Data 614. Although the asset manager will need some personal data (e.g., social security number, date of birth) as a matter of course for opening an investment account, the PRIA fund itself does not need such personal data. The data that the individual provides would include the amount to be invested initially and in later periods, the number of years before scheduled payouts commence, the number of years that scheduled payouts are needed, minimum and maximum range of payout amounts. Next the user selects investment choices 616, i.e., the sub-funds they are likely to invest in, if they participate in a PRIA fund. The third step is to select other optional PRIA fund features offered by the asset manager. The fourth step is to select illustration assumptions necessary to run the simulation. For example, the individual could have an option to select from a menu of choices, the economic environment that would be in place over the simulation period, such as high growth, low growth, inflation, and market shock scenarios.

When a user 602 or 604 starts the IS 624, the IS reads any data necessary to perform the calculations that is stored in the Illustration Module Database 622. The type of data and calculations required are described later in this document. The database would be populated by data provided by one or more Asset Manager Sales Systems 626, and other external sources of financial data.

Although FIG. 6 does not explicitly show an interface between the Sales Application Portal 606 and the Participant Applications Portal (PAP) 528 described above, such a link is envisaged to be provided as a seamless link between the two. This link is shown explicitly in FIG. 7 as P-Link 726.

FIG. 7 shows the three software systems described above, FDS 706, FAS 716 and PSS 714. The Asset Manager's Applications 702 for the FDS 706 and the FAS 716 include the Asset Manager Applications Interface 424 for the Fund Design System Model 402 illustrated in FIG. 4, and the Asset Manager Applications for Front, Middle and Back Office 514 and PRIA Applications 524 illustrated in FIG. 5. The Participant Applications 704 for the FAS 716 and the PSS 708 include the Participant Applications Portal 528 illustrated in FIG. 5 and the Sales Applications Portal 606 illustrated in FIG. 6.

Simulation FDS Data 718 is used for running the software programs in the FDS. Simulation PSS Data 720 is used for running the software programs in the PSS. Once a PRIA fund is set up and operational, both the participant and asset manager would be using Real FAS Data 722 for the queries and programs that are run in the FAS 710.

An asset manager may use an M-Link 724 from the FDS 706 simply to access the FAS 710. A more integrated embodiment can include applications that share data and analytics seamlessly between the two. Similarly, a participant may use a P-Link 726 from the PSS 708 simply to access the FAS 710, and a more integrated embodiment can include applications that share data and analytics seamlessly between the two.

Each of these three software systems contains a PRIA Processor, 712, 714, 716 that is essentially the same set of calculations required to track the creation, dynamics and on-going management of a PRIA fund, and customized to produce the information required by the asset manager or participant using those software systems.

The following describes the details of the PRIA Processor, as applied to the PRIA Fund Administration System (FAS) 716, recognizing that the same core calculations are made in the FDS 712 and the PSS 714.

PRIA Data Requirements and Calculations.

Referring to FIG. 1, the main objects of a PRIA fund were described above. Specifically, a Unit, U, with Asset Value, A, 108 is the most granular representation of ownership interest in a sub-fund by a participant, and the variable U(p,q,f,g,t) is the most granular object defining the number of units owned by a participant, p, 110 through an investment lot, q, 112 in sub-fund, g, 106 of a PRIA fund, f, 104 offered by an asset manager, m, 102, at time t, with an asset value of A(p,q,f,g,t).

Static Attributes

Each of the objects defined above possess static attributes that do not change over time and dynamic attributes that are changeable. The following describe some of the static attributes in the preferred embodiment. Other attributes may be added depending on the particular embodiment of the invention that is implemented, or the particular software system as illustrated in FIG. 7.

Each Participant has the following attributes:
- a. A unique participant identifier or number, p that identifies an individual investor for an asset manager. (At this point an individual's account is tracked only within one asset manager's PRIA funds; an individual's accounts across multiple asset managers are not tracked, although that can also be incorporated.)
- b. A secondary participant identifier to act as a check to ensure proper tracking of data. An example would be date of birth. Alternative secondary identifiers besides date of birth are also possible. The PRIA Overlay System POS 504 does not require private information such as name, gender, social security or similar number, maintained by the asset manager's conventional asset management system AMAS 502.
- c. An investment record that is a data matrix of all investments made by a participant in fund f, showing lots purchased in each sub-fund g, dates of those purchases, deposits made and units purchased. (Dynamic data fields are included for participant events such as withdrawals and additional deposits, and will be updated whenever such an event occurs.)
- d. The date of first investment in the PRIA fund is a timestamp which can be used for various payout calculations.
- e. The payout start date, b, is the date selected by the participant from which scheduled sales from the PRIA fund commence, and the net proceeds are paid to the participant.
- f. The payout end date, e, is the date on which sales and payouts from the PRIA fund are scheduled to end. With some embodiments, this date is not required. For example if a participant elects to sell sufficient assets to meet a certain targeted dollar amount of proceeds, then the payout end date is not easily specified, even though an end date will inevitably occur.
- g. A payout vector, V, that defines the schedule for selling investments from the payout start date, b. One component of the vector is a series listing the participant's scheduled payout dates. Another component of the vector is a data field associated with each payout date that specifies the proportion of units to be sold, or the proceeds required from sales, or some other formula that determines the amount of investments to be sold. This payout vector may be modified and updated at various points in time, depending on the fund rules established by the asset manager.

Each Lot has the following attributes:
- a. A unique Lot identifier, q, that identifies a purchase of units in a sub-fund of a fund
- b. A Participant identifier to register which participant, p, owns the lot
- c. A fund identifier to register the fund, f, that governs the sub-fund in which an investment is made
- d. A Sub-fund identifier to register the sub-fund, g, in which an investment is made
- e. The purchase date, d, on which lot was purchased
- f. The amount of assets invested, A, in sub-fund g, updated for any voluntary withdrawals or scheduled payouts
- g. The number of units purchased, U, in sub-fund g, updated for any voluntary withdrawals or scheduled payouts Each Fund has the following attributes:
- a. A unique Fund identifier label, f that identifies a specific PRIA fund
- b. A Sub-fund list that identifies which sub-funds are offered under the fund
- c. A Participant list that identifies which participants invest in the fund
- d. A set of Fund rules that specify all the processes for various participant and fund dynamics. Among these rules will be those that govern the determination of Lower Asset Values (LAV) on early voluntary withdrawals or on death, and the determination of Demographic Returns (DR) and the allocation of each period's Contribution to Demographic Returns (CDR) to each participant.
- e. A set of Fund rules that specify the processes for charging Fund fees to participants.

Each Sub-fund has the following attributes:
- a. A unique Sub-fund identifier label, g, that identifies a specific investment choice for participants
- b. A Fund list that identifies which PRIA funds offer this sub-fund as an investment choice
- c. A Participant list that identifies which participants invest in the sub-fund
- d. A set of Sub-fund rules that specify the processes for charging sub-Fund fees to participants Dynamic Attributes In order to consider the dynamic attributes of PRIA fund objects, the time steps for calculations need to be specified. As a general proposition, the calculations set forth below can work for any required time step, with parameters appropriately calibrated for that interval. For the PRIA Fund Administration System (FAS) 716, daily time steps will be required since NAV calculations are typically updated daily. For the PRIA Fund Development System (FDS) 712, where an asset manager is simulating PRIA fund performance over many years, annual time steps would be reasonable. Similarly for the PRIA Participant Sales System (PSS) 714, where a participant is assessing a long-range investment horizon, annual time steps would also be appropriate. These systems will incorporate any day count convention that is consistent with business practice.

All valuations may be done at the end of a business day and available at the start of the following business day. The calculations may also be done within any time period that makes sense. All sales of units for withdrawals are executed at prices on order day close. All purchases of units for new deposits are made at prices on order day close. (Other embodiments can implement different rules for valuations and execution prices on sales and purchases.)

In the description below, the following notation convention is followed. All values and shares/units are calculated at start and end points of the interval. Using the generic variable name, ValueName, for a variable that is to be valued at each calculation time, the notation is ValueName(, . . . , t−1) for the variable's starting value at time (t−1), and ValueName(, . . . , t) for the variable's ending value at time t. Similarly, using the generic name, FlowName, for all variables signifying flows during the interval (t−1) to t, the notation for all flows in the interval is FlowName(, . . . t)

FIG. 8 illustrates the calculations and data flows to be performed at each time step. The data flows from the asset manager's administration system 802 (which is the same system labeled as 502) to the PRIA overlay system (which is the same system labeled as 504) and is sent back to the asset manager's administration system 806 (which is the same system labeled as 502).

The sequence of calculations from time step (t−1) to t is summarized as follows:
1. Initialize starting values at time (t−1) 808.
   a. This is the same as the ending values for the interval (t−2) to (t−1).
   b. By definition, all calculations for a fund, f, start at its inception at time 0
2. Track all participant actions and flows in the interval (t−1) to t 810.
   a. Track Early Withdrawals due to voluntary elections
   b. Track Early Withdrawals due to death
   c. Track Scheduled Payouts under participant's previous election
   d. Track New Deposits by current and new participants
3. Track all fund actions and flows in the interval (t−1) to t 812.
   a. Track all investment earnings on assets
   b. Track expenses charged at sub-fund level
   c. Track expenses charged at fund level
   d. Track Contribution to Demographic Returns (CDR)
4. Add and subtract flows to update ending values at time t 814.
   a. Reduce assets and shares/units for Early Withdrawals due to voluntary elections
   b. Reduce assets and shares/units for Early Withdrawals due to death
   c. Reduce assets and shares/units for Scheduled Payouts
   d. Increase assets and units in DR sub-fund for Contribution to Demographic Returns (CDR)
   e. Increase assets and shares/units for New Deposits from current and new participants
   f. Increase assets and sub-fund NAV for asset earnings net of sub-fund manager expenses
   g. Reduce assets for expenses charged at sub-fund level
   h. Reduce assets for expenses charged at the fund level When applying these steps with the PRIA Fund Administration System (FAS) 710, real data is used. When applying these steps with either the PRIA Fund Development System (FDS) 706 or the PRIA Participant Sales System (PSS) 708, real data would not be available for all data fields, and simulation data would be used instead, as indicated in FIG. 7.

The details of each of the calculations at each time step are described below.

Starting Values at Time (t−1)

At the most granular level, an individual p owns a lot q in a sub-fund g of fund f. Asset values and number of units are available from the asset manager. Similarly sub-fund net asset values (NAV) would be available. The PRIA overlay system 504 would retrieve that information from the asset manager administration system 502 and perform the calculations and checks below.

There are several choices when aggregating from the most granular level to the fund level. In the list below, aggregation perspectives are tagged as P for participant's perspective, G for sub-fund's perspective, and F for fund's perspective. If an asset manager offers several funds, f, then an individual participant, p, would be able to aggregate over all the investments in all those funds. Similarly, the asset manager, M, would be able to track all the assets held in PRIA funds. Therefore the asset manager's perspective is included in the aggregation calculations. For example, the tag (P, F) signifies values from the perspective of both a participant (P) and a Fund (F).

Checks for consistency are used to ensure that the same values are produced when successive aggregation follows a different path.

Note that the aggregation of sub-funds includes the DR sub-fund. The mechanics of the DR sub-fund will be described in greater detail below.

First sum all variables from participant's perspective up to fund level:
1. (P,G,F) For participant p's lot q in fund f's sub-fund g:
   a. Assets in g: $A(p,q,f,g,t-1)$
   b. Units in g: $U(p,q,f,g,t-1)$
   c. Check: $A(p,q,f,g,t-1)=NAV(f,g,t-1) \times U(p,q,f,g,t-1)$
   d. This information is available from asset manager.
2. (P,G,F) For participant and fund perspectives, sum over all lots q to give participant p's investment in fund f's sub-fund g:
   a. Assets in g: $A(p,f,g,t-1)=\Sigma_1^Q A(p,q,f,g,t-1)$
   b. Units in g: $U(p,f,g,t-1)=\Sigma_1^Q U(p,q,f,g,t-1)$
   c. Check: $A(p,f,g,t-1)=NAV(f,g,t-1) \times U(p,f,g,t-1)$
3. (P,F) Sum over all sub-funds g to give participant p's total investment in fund f
   a. Assets in f: $A(p,f,t-1)=\Sigma_1^G A(p,f,g,t-1)=\Sigma_1^G \Sigma_1^Q A(p,q,f,g,t-1)$
   b. Shares in f: $S(p,f,t-1)=A(p,f,t-1) \times S(f,t-1) \div A(f,t-1)$
   c. Check: $A(p,f,t-1)=S(p,f,t-1) \times SAV(f,t-1)$
   d. It is meaningless to aggregate units in g over all sub-funds, so that summation is not performed.
   e. A participant only buys units in sub-funds and not shares in a PRIA fund. The shares, S, in f are a means to signify the proportion of total fund f assets owned by participant p, and may be used to perform calculations that require this as an input. Similarly, the value of a participant's total investment in a PRIA fund is denoted by Share Asset Value, SAV. The SAV is a calculation device and does not represent a purchase of investments by a participant at that price per share.
   f. Full or partial withdrawal payment is based on Lower Asset Value, LAV for participant p's lot q, in fund f's sub-fund g, which can vary by the cause, c, for the withdrawal. The simplest causes for early withdrawal are voluntary full or partial withdrawal, c=w, or full withdrawal on death, c=d.

i. The LAV design is a key component of the PRIA product and the basis on which Demographic Returns (DR) are generated at every time step.
ii. The LAV should be designed to deliver a PRIA product that is attractive to participants, specifically those who want to save for the long-term but are also interested in maintaining control of their investment choices, including their ability to withdraw funds on demand. The trade-off that the asset manager has to consider is whether to provide a higher payout on withdrawal, or a larger payout stream in retirement. A higher LAV (and the closer it is to the NAV) results in a larger early withdrawal payout, but a smaller amount that would be contributed to the DR sub-fund, making the product less attractive to long-term savers who stay through retirement. On the other hand, a lower LAV schedule would reduce the payout on withdrawal, while increasing the DR that is generated, thereby leading to a higher payout stream during retirement. A lower LAV schedule could encourage participants to defer making deposits into a PRIA fund until they are confident they would not need an early withdrawal. This is illustrated in FIG. 9 in which growth in the value of invested assets is graphed over time (not drawn to scale). The scheduled payout amount, based on the NAV of all funds including the DR-sub-fund, is reflected in the topmost line 902. An equivalent non-PRIA fund value, based on the NAV of all sub-funds excluding the DR sub-fund, is reflected in the middle line, 904. The withdrawal amount, based on the LAV of all funds including or excluding the DR sub-fund as determined by fund rules, is reflected in the bottom-most line 906. If the LAV is increased so that it is closer to NAV, then both lines 902 and 906 would be closer to line 904, and vice versa.
iii. LAV(p,q,f,g,t|c) is set by fund f's formula and depends on p's history in the fund and will most likely be specified at the lot level; see Participant actions and flows section below for more detail.
iv. Withdrawal Proceeds for reason c on full liquidation is:

$$WP(p,q,f,g,t|c)=U(p,q,f,g,t-1)\times LAV(p,q,f,g,t|c)$$

v. On partial withdrawal, fund rules would dictate which specific assets could be sold. For example, all sub-fund units could be sold proportionately, or units in specific sub-funds could be sold at the participant's discretion. An equitable fund rule would require all DR sub-fund units to be sold in proportion to the full withdrawal request by the participant, with sale of the other sub-fund units to follow a fund-specified formula or a participant-directed allocation. Although DR sub-fund units would be sold proportionately on any partial withdrawal, the participant would get additional units of the DR sub-fund reflecting the invested assets still remaining in fund, f
vi. In this embodiment, values of all participant flows such as withdrawals and deposits are calculated using LAV and NAV values at the end of the period, i.e., at t. An alternative embodiment would calculate these values using LAV and NAV values another point in time, for instance at the start of the period, i.e., at (t−1). All the calculations illustrated herein would be modified accordingly. For instance, the Withdrawal Proceeds equation shown above would be modified to:

$$WP(p,q,f,g,t|c)=U(p,q,f,g,t-1)\times LAV(p,q,f,g,t-1|c)$$

4. (F) Sum over all participants p to give total investment in fund f:
   a. Assets in f: $A(f,t-1)=\Sigma_1^P A(p,f,t-1)=\Sigma_1^P \Sigma_1^Q A(p,q,f,g,t-1)$
   b. Shares in f: $S(f,t-1)=\Sigma_1^P S(p,f,t-1)$
   c. Check: $A(f,t-1)=S(f,t-1)\times SAV(f,t-1)$ Next, aggregate from a sub-fund's perspective up to the fund level. The starting point is the same as in the first two bullets 1 and 2 above, so those are not repeated here.

5. (G,F) Sum over all participants p to give total investment in fund f's sub-fund g:
   a. Assets in f: $A(f,g,t-1)=\Sigma_1^P A(p,f,g,t-1)=\Sigma_1^P \Sigma_1^Q A(p,q,f,g,t-1)$
   b. Units in g: $U(f,g,t-1)=\Sigma_1^P U(p,f,g,t-1)=\Sigma_1^P \Sigma_1^Q U(p,q,f,g,t-1)$
   c. Check: $A(f,g,t-1)=NAV(f,g,t-1)\times U(f,g,t-1)$ 6. (F) Sum over all sub-funds g to give total investment in fund f:
   a. Assets in f: $A(f,t-1)=\Sigma_1^G A(f,g,t-1)=\Sigma_1^G \Sigma_1^P \Sigma_1^Q A(p,q,f,g,t-1)$
   b. Check: A(f,t−1) is the same value as calculated in bullet 4 above
   c. Units are not aggregated since that is meaningless Next, aggregate up to the asset manager level.

7. (P,M) Sum over all funds f to give participant p's total investment in asset manager M's PRIA funds:
   a. Assets in M: $A(p,t-1)=\Sigma_1^F A(p,f,t-1)=\Sigma_1^F \Sigma_1^G \Sigma_1^Q A(p,q,f,g,t-1)$
   b. Shares in f are not aggregated since that is meaningless 8. (M) Sum over all funds f and participant p to give the total assets in M's PRIA funds:
   a. Assets in M: $A(t-1)=\Sigma_1^P A(p,t-1)=\Sigma_1^P \Sigma_1^F \Sigma_1^G \Sigma_1^Q A(p,q,f,g,t-1)$
   b. Check: $A(t-1)=\Sigma_1^F A(f,t-1)$ which sums the assets calculated in bullet 6 above.

In addition to these starting values, the following per unit or per share values would also be available or calculated at this stage:

9. Net asset value, NAV, of sub-fund, g:
   a. The NAV of all sub-funds, including the DR sub-fund, grows only with investment returns of the sub-fund, net of expenses charged at the sub-fund level and not already included in the investment return calculation.
   b. A sub-fund can be earmarked for single use with a single PRIA fund only. Alternatively, it can be a multi-use sub-fund as illustrated in FIG. 10, by offering different series of units for each distinct type of investor in that sub-fund. In that case, one series can be used as an investment choice for PRIA fund, f, 1002, another series used for another PRIA fund 1004, and different series used for other investment programs 1006 offered by the asset manager, whether those are other PRIA funds, or not, e.g., a variable annuity fund 1008. In a multi-use sub-fund, features such as investment strategy and portfolio manager are the same across all series, while other features such as expenses, minimum and maximum investment amounts, can differ by series. Since the multi-use sub-fund is the general case and the single-use sub-fund is a special case of that, the calculations assume that a multi-use sub-fund is being used.
   c. For a multi-use sub-fund, g, NAV is calculated for the series of units offered under fund, f. If all series have identical terms, then in that special case, the NAV is the same for all series, i.e. NAV(f,g,t−1)=NAV(g,t−1)
d. For a multi-use sub-fund, the NAV for the sub-fund series appropriate for the fund, f, is. NAV(f,g,t−1)
e. The asset manager would calculate the NAV by dividing the total amount invested in the series for the sub-fund by the total number of units in the series for that sub-fund
f. This calculation can be verified at any more granular level within the sub-fund, e.g., the check in the line below uses the NAV to check that the calculated asset value equals the value reported by the asset manager
g. Check asset values: A(p,q,f,g,t−1)=U(p,q,f,g,t−1)×NAV(f,g,t−1)
h. As noted earlier, the sub-funds can be any investment instruments that the asset manager is able and willing to offer its investors. If a sub-fund is also a managed investment fund such as a mutual fund, it need not be offered or managed by the same asset manager that offers the PRIA fund. For instance, if fund manager ABC offers a PRIA fund to its investors, then that PRIA fund can make available sub-funds offered by other asset managers, for example mutual funds managed by fund manager XYZ.

10. Share asset value, SAV of fund, f:
   a. The number of shares, S, and the SAV are both devices to create a similar set of metrics at the fund f level as the units and NAV provide at the sub-fund level. The participant always purchases units in a sub-fund and never purchases shares in the fund. (Alternative embodiments can include the ability for investments to be made directly at the fund level as well.) Nevertheless, while it is accurate for a participant to consider a deposit into the fund f as a deposit into an account through which purchases of units in specific sub-funds are made, it may be convenient for both the participant and the asset manager to use the SAV and the share S as a way to understand how the overall investment is growing over time. The SAV works in the same way as NAV does for a sub-fund. At inception of a fund, its SAV is $1 since every dollar invested purchases one share. The SAV grows with net investment returns earned in the sub-funds and with the growth of Demographic Return (DR) sub-fund, net of expenses charged at the fund level, if any.
   b. For a participant p, the total assets invested across all sub-funds equals the number of shares in the sub-fund valued at the SAV:

$A(p,f,t-1)=S(p,f,t-1)\times SAV(f,t-1)$ c. A participant's number of shares S(p,f,t−1) fluctuates with the proportion of the fund's assets owned by the participant
      i. Since the shares are not purchased, they may not grow and fall in tandem with the participant's deposits and withdrawals. Instead a participant's share will be influenced by the deposits and withdrawals of all participants in the same fund.
      ii. The participant's investment value A(p,f,t−1) will grow and fall in tandem with the participant's deposits and withdrawals since that is a reflection of the invested assets in the underlying sub-funds $$S(p,f,t-1) = \frac{A(p,f,t-1)}{A(f,t-1)} \times S(f,t-1)$$

d. Check: For the whole fund f asset value equals total shares valued at SAV:

$A(f,t-1)=S(f,t-1)\times SAV(f,t-1)$

Participant Actions and Flows During Interval (t−1) to t

Each participant can take a number of actions that will impact values at the end of the period. A participant can withdraw from the PRIA fund early before one or more scheduled payout dates, whether involuntarily on death or voluntarily for some other reason, or they can receive a payout on a scheduled date, or they can make additional deposits. A new investor can also join the fund in the interval. All these actions result in net flows out the fund or into the fund. In addition, investors can reallocate their holdings between sub-funds, which would not change their total investment in the fund, except for any fees that the asset manager may impose for such a transfer. The calculations for each of these actions are described below.

Any number of participant actions can occur in any time interval. For simulation applications that consider time periods longer than a single business day, for example, multiple actions can occur during such an interval. For a smaller interval such as a business day, only one withdrawal and one deposit action may be reasonable.

There are other practical limitations that are imposed to ensure logical consistency in the calculations, and these will require the asset manager to set up rules to ensure that the participant actions are treated appropriately. For example, if a partial or full voluntary withdrawal is made during the same time interval that a new deposit is made, the fund rules will determine whether those are to be treated as two separate and independent transactions or if they are to be netted, resulting in either a new deposit or a partial withdrawal. In another example, if a partial withdrawal election is made in the same time period during which the participant dies, then the fund rules will determine if those are to be considered as a single withdrawal action or two, and whether the payout would be based on the NAV or LAV, or a blend of both.

The following describes the calculations for each of the participant actions:

1. Early withdrawal due to death, c=d:
   a. The participant's account is closed on death and proceeds are paid to beneficiaries. This is consistent with the treatment of accounts in conventional investment funds.
   b. All units in the sub-funds are sold at the closing NAV and the total proceeds from the sales is DA(p,f,t), after deducting any sub-fund fees at that stage, where $DA(p,f,t)=A(p,f,t)$ c. The amount payable to the beneficiaries is based on assets accumulated at periodic lower investment return over the investment period for each lot. The accumulated lower return is defined as the LAV. Note that the LAV operates in the same manner as the NAV and SAV, so it is a value specified at the end of a period, in this case at t.
   d. Instead of the periodic actual asset growth of ΔA(p,q,f,g,t) in each period since inception, the starting asset would be credited with a lower asset growth in that period and all periods prior to withdrawal. The LAV then signifies the compounded return over time for the assets, net of prior withdrawals, associated with that lot. Summing over all lots q over all sub-funds g, this payout amount would then be written as:

$DP(p,f,t|d)=\Sigma_1{}^G\Sigma_1{}^Q U(p,q,f,g,t-1)\times LAV(p,q,f,g,t|d)$ e. Although the LAVs cannot strictly be summed, as a short-hand and to signify that the participant's shares in fund fare sold at a lower rate, this can be written as:

$$DP(p,f,t|d)=S(p,f,t) \times LAV(p,f,t|d)$$

f. The difference between the 2 values is the Contribution to the DR (CDR) assets due to this event, i.e. CDR(p,f,t)=DA(p,f,t)−DP(p,f,t|d)

g. In summary, the changes in assets and units are as follows:
  i. Lots sold: DU(p,q,f,g,t)=U(p,q,f,g,t−1)
  ii. Assets sold: DA(p,q,f,g,t)=A(p,q,f,g,t)
  iii. Summing across all lots and sub-funds, total assets sold by the participant is: $DA(p,f,t) = \Sigma_1^G \Sigma_1^Q WA(p,q,f,g,t)$
  iv. Check: DA(p,f,t)=A(p,f,t)
  v. Amount paid on withdrawal is DP(p,f,t|d)
  vi. The difference between the assets sold and the amount paid to beneficiaries is the contribution to the DR due to this event, i.e.

$$CDR(p,f,t)=DA(p,f,t)-DP(p,f,t|d)$$

2. Voluntary early withdrawal, c=w:
  a. In general, there can be several reasons or causes, c, allowed by an asset manager for voluntary withdrawal, each of which may be treated differently in the parameters for the calculations, although the formulae may be substantially consistent. For example, there may be different processes and parameters for voluntary withdrawals due to health reasons than without such a reason. For illustration of the calculations, assume that the participant has full discretion at all times, and there is only set of processes and parameters for reason, w.
  b. The number of units for withdrawal is based on the starting units (i.e., at time t−1) valued at the end of period NAV(i.e., at time t), or equivalently asset value at the end of period value (i.e., at time t)
  c. Amount to be withdrawn is defined as WA(p,f,t|w). This can be specified in several different ways that ultimately determine the number of units in each sub-fund g that will be sold to generate the proceeds to make the early withdrawal payment. At the most granular level, if the fund's rules allow it, the participant can explicitly state the number of units in each lot that would be sold to generate the proceeds on withdrawal. The fund's rules would also allow a more formulaic selection of units to be sold, as the following example illustrates:
    i. A participant specifies the percentage Wpercent(p,f,t|w) of invested assets A(p,f,t) to be withdrawn. This results in the sale of the same proportion of assets and units in each lot q of the sub-funds g. Applying the lower return on early withdrawal to each lot in each sub-fund, the amount to be withdrawn is written (similar to payout on death) as:

$$WP(p,f,t|w)=W\text{percent}(p,f,t|w) \times \Sigma_1^G \Sigma_1^Q U(p,q,f,g,t-1) \times LAV(p,q,f,g,t|w)$$

or as a short-hand at the fund level, as:

$$WP(p,f,t|w)=W\text{percent}(p,f,t|w) \times S(p,f,t-1) \times LAV(p,f,t|w)$$

ii. At each lot, q, of sub-fund, g, the units and resulting assets sold are:
      A. Lots sold: WU(p,q,f,g,t)=U(p,q,f,g,t−1)×Wpercent(p,f,t|w)
      B. Assets sold: WA(p,q,f,g,t)=A(p,q,f,g,t)×Wpercent(p,f,t|w)
      C. Summing across all lots and sub-funds, total assets sold by the participant is:

$$WA(p,f,t) = \Sigma_1^G \Sigma_1^Q WA(p,q,f,g,t)$$

D. Check: WA(p,f,t)=A(p,f,t)×Wpercent(p,f,t|w)
      E. Amount paid on withdrawal is WP(p,f,t|w)
      F. The difference between the assets sold and the amount paid to beneficiaries is the contribution to the DR due to this event, i.e.

$$CDR(p,f,t)=WA(p,f,t)-WP(p,f,t|w)$$

d. Any withdrawal will result in a proportional reduction in the units of the DR sub-fund since the allocation of the DR sub-fund represents a proportional participation in the Demographic Return generated by all the participants in the fund. Note that if a partial withdrawal is made, and the fund rules permit, the participant may receive an allocation of the total contribution to the DR in that period, based on the value of their remaining assets.

3. Scheduled Payout:
  a. The participant has a pre-arranged payout schedule, per the rules of the fund. This schedule can be set at each lot level, i.e. there is a payout schedule that is selected by a participant to apply to each investment lot, or it can be set at a higher level of aggregation such as at the participant level, i.e., the payout schedule applies to all lots across all sub-funds owned by the participant. The schedule will require the sale of sub-fund units with the proceeds payable to the participant at full value without any reduction, after deducting any fees charged at that stage.
  b. Units are held until the payout start date, b, and the last shares and units are sold on the payout end date, e. The payout schedule defines the number of shares and units sold at each payout date, t, between and including dates b and e. Any payout pattern is permissible, subject to the rules set by the asset manager. At the most granular level, if the fund's rules allow it, the participant can explicitly state the number of units in each lot that would be sold to generate the proceeds on a scheduled payout date. The fund's rules may require that the scheduled number of units must be sold on a scheduled date. Alternatively, the fund's rules may allow any number of units to be sold from zero up to the maximum scheduled number of units, and that any units not sold on a scheduled date may be sold at some later scheduled or unscheduled date, at a value to be determined at that time based on either the NAV, the LAV or some combination thereof. The fund's rules would also allow a more formulaic selection of units to be sold, as the following example illustrates. In the example, the rule requires a sale of assets proportional to the number of remaining payout dates. The mechanics are identical to voluntary early withdrawal just above, except that the full asset proceeds are paid out. For completeness, the steps are set out below.
  c. Amount to be paid per schedule is SA(p,f,t). This can be specified in several different ways that ultimately determine the number of units in each sub-fund g that will be sold to generate the proceeds to make the early withdrawal payment. For example:
i. Percentage Spercent(p,f,t) of invested assets A(p,f,t−1) can be sold on a payout date where $$SPercent(p, f, t) = \frac{1}{t - e},$$

for b≤t≤e ii. This results in the sale of the same proportion of assets and units in each of the sub-funds g: SA(p,f,t)=Spercent(p,f,t)×A(p,f,t))
iii. At each lot, q, of sub-fund, g, the units and resulting assets sold are:
  A. Lots sold: SU(p,q,f,g,t)=U(p,q,f,g,t−1)×Spercent(p,f,t)
  B. Assets sold: SA(p,q,f,g,t)=A(p,q,f,g,t)×Spercent(p,f,t)
  C. Summing across all lots and sub-funds, total assets sold by the participant is:

$$SA(p,f,t) = \Sigma_1^G \Sigma_1^Q SA(p,q,f,g,t)$$

D. Check: SA(p,f,t)=A(p,f,t−1)×Spercent(p,f,t)
  E. Amount paid on scheduled payout is SP(p,f,t)=SA(p,f,t)

4. Deposits by current participants
  a. A participant can make additional deposits into the fund at any time, even while receiving scheduled payouts or after making a voluntary early withdrawal (but obviously not after the account is closed on death or for some other reason). The amount of assets deposited by participant p in fund f in the interval t−1 to t is defined by DepA(p,f,t). If required, this is easily restated as a percentage increase in starting assets by dividing the deposit amount by the starting assets that the participant has in the fund, i.e.

$$DepPercent(p,f,t) = DepA(p,f,t) \div A(p,f,t-1)$$

b. Each deposit is allocated to specific sub-funds based on the participant's election. Note that in this illustrated embodiment, the participant will not be able to invest directly in the DR sub-fund since units in that sub-fund are earned by participating in the PRIA fund, and allocated whenever CDR is generated. An alternative embodiment may allow participants to invest directly in the DR funds, and the fund's rules would specify the terms, conditions, formulae and calculations to enable implementation.
  c. Using the notation convention for flows in the interval, a new deposit results in an allocation to new lot δ in a specific sub-fund g is:
    i. Percent of deposit allocated to sub-fund g is DepAlloc(p,δ,f,g,t)
    ii. Amount of the deposit in sub-fund g is $$DepA(p,\delta,f,g,t) = DepA(p,f,t) \times DepAlloc(p,\delta,f,g,t)$$

iii. Number of units in sub-fund g due to the deposit is the amount invested divided by the sub-fund's closing NAV:

$$DepU(p,\delta,f,g,t) = DepA(p,\delta,f,g,t) \div NAV(f,g,t)$$

iv. Check: Sum over all new lots and sub-funds should equal the total new deposit $$DepA(p,f,t) = \Sigma_1^G \Sigma_\delta DepA(p,\delta,f,g,t)$$

5. Deposits by new participants
  a. New participants can join the fund and make deposits at any time. The mechanics of their participation is identical to the mechanics for deposits by current participants described in the previous bullet. The difference from an administrative standpoint is that a new participant account would have to be opened before the deposit can be accepted.

6. Transfer between sub-funds
  a. As described above, an asset manager can allow a participant to transfer assets between sub-funds, within defined constraints, and potentially paying fees on that event. So long as the sub-funds are within the same fund, f, there should be no impact on the DR sub-fund share that such a participant owns, except for the impact of the fees deducted.

Fund Actions and Flows During Interval t−1 to t

After all the participant actions are recorded and flows calculated as detailed above, the fund actions described below are addressed and resulting flows calculated. In particular, withdrawals will reduce the amount of assets in a sub-fund and deposits will increase the assets. The fund actions and flows listed below are calculated based on the assets at the start of the period reduced for withdrawals (voluntary, death or scheduled) and increased by deposits (current or new participants) during the period.

1. Investment earnings on assets
  a. The asset manager reports the investment earnings for each sub-fund, g, net of fees charged by the portfolio manager of the sub-fund, and the amount allocated to each participant's lot. (If the portfolio manager's fees and the PRIA fees at the sub-fund level are charged by the asset manager at the same time at the sub-fund level, then the two fees can be separated and tracked separately, even if that split is not reported separately to the participant. This enables proper allocation of fees for attribution purposes. This is discussed further below.)
  b. The investment earnings increase the NAV of the sub-fund
  c. An investor's assets grow by the growth in the NAV
  d. Investment earnings, net of any portfolio manager fees, in the interval t to t−1 at each level of aggregation are:
    i. Unit q: ΔA(p,q,f,g,t)
    ii. Participant p: ΔA(p,f,g,t)=$\Sigma_1^Q$ΔA(p,q,f,g,t)
    iii. Sub-fund g: ΔA(f,g,t)=$\Sigma_1^P \Sigma_1^Q$ΔA(p,q,f,g,t)
  e. As an alternative but equivalent mechanism for allocating earnings, if the asset manager reports the total sub-fund earnings, then the allocation to each participant and lot would be made on a pro-rata basis, for example, based on the number of units held in the sub-fund at the end of the period, adjusting for in-period withdrawals and new deposits; the mechanics of the calculation should be verified with the aggregation method of the previous bullet, and adjusted accordingly:
    i. Unit q:

$$\Delta A(p, q, f, g, t) = \Delta A(f, g, t) \times \frac{U(p, q, f, g, t)}{U(f, g, t)}$$

ii. Participant p:

$$\Delta A(p, f, g, t) = \Delta A(f, g, t) \times \frac{U(p, f, g, t)}{U(f, g, t)}$$

2. Expenses charged at sub-fund level
   a. At the sub-fund level, there are two broad categories of fees charged by the asset manager. The first is fees charged by the portfolio manager of the sub-fund for the regular services of managing the investments. The second is fees charged for services and administration for inclusion of the particular sub-fund within the PRIA fund. The asset manager may combine these fees into a single charge to the participant. The asset manager may choose to track these fees separately, for example, to make comparisons between alternative investment choices for participants on a consistent basis. In addition to these fees, the asset manager may charge fees for other services and participant actions. These include, but are not limited to, fees on withdrawal of assets via sale of investments, and transfer of assets between sub-accounts. Fees can differ by fund, f and sub-fund g so that other investors not in fund f may pay a different set of fees, if any. Fees may be charged using a variety of formulae, for example, a fixed fee or a fee based on a percentage of invested assets. The fees are allocated to individual investment lots or to each participant in a sub-fund in a way defined by fund rules. For example, some fees may be charged based on the proportion of assets or units owned.
   b. Expenses charged at the sub-fund level in the interval t to t−1 at each level of aggregation are:
      i. Unit q: ExpG(p,q,f,g,t)
      ii. Participant p: ExpG(p,f,g,t)=$\Sigma_1^Q$ExpG(p,q,f,g,t)
      iii. Sub-fund g: ExpG(f,g,t)=$\Sigma_1^P\Sigma_1^Q$ExpG(p,q,f,g,t)
   c. As an alternative but equivalent mechanism for allocating expenses, if the asset manager reports the total sub-fund expenses, then the allocation to each participant and lot could be made on a pro-rata basis, for example, based on the number of units held in the sub-fund at the end of the period, adjusting for in-period withdrawals and new deposits (and to be verified with aggregate calculations in the previous bullet):
      i. Unit q:

$$ExpG(p, q, f, g, t) = ExpG(f, g, t) \times \frac{U(p, q, f, g, t)}{U(f, g, t)}$$

ii. Participant p:

$$ExpG(p, f, g, t) = ExpG(f, g, t) \times \frac{U(p, f, g, t)}{U(f, g, t)}$$

3. Expenses charged at fund level
   a. The asset manager can impose charges at the fund level as well. These expenses can differ by fund, f and are set by the asset manager. Although the mechanics for charging fees on a similar basis as a sub-fund are described below for completeness, it should be recognized that these fees can only be collected at the fund level from cash flow generated at the fund level. Since the embodiment being described assumes that all investments are made at the sub-fund level, and therefore all earnings are generated at the sub-fund level and not the fund level, the only fees that can be charged and collected at the fund level are those that are associated with events where investments are sold at the sub-fund level, and some or all of the resulting proceeds are either paid out to the participant or deposited in another sub-fund. Examples of such fees are those charged on unscheduled early withdrawal or on a transfer of assets between sub-accounts.
   b. If fees are chargeable and collectable at the fund level, they would be allocated to each participant in a way defined by fund rules.
   c. Expenses charged at the fund level in the interval t to t−1 at each level of aggregation are:
      i. Participant p: ExpF(p,f,t)
      ii. Fund f: ExpF(f,t)=$\Sigma_1^P$ExpF(p,f,t)
   d. As an alternative but equivalent mechanism for allocating expenses, if the asset manager reports the total fund expenses, then the allocation to each participant would be made on a pro-rata basis, for example, based on the number of shares held in the fund at the end of the period, adjusting for in-period withdrawals and new deposits (and to be verified with aggregate calculations in the previous bullet):
      i. Participant p:

$$ExpF(p, f, t) = ExpF(f, t) \times \frac{S(p, f, t)}{S(f, t)}$$

4. Contributions to demographic returns (CDR)
   a. FIG. 11 illustrates the how CDR is created and how it is then allocated to participants. There are P participants labeled 1 to P, each with PRIA units 1102 (in sub-funds) with PRIA asset values 1104. Participant 1 decides to make an unscheduled early withdrawal of all their assets. This results in the sale of all sub-fund units 1106. The proceeds of the sale at NAV are split into two parts. The first part values the units at LAV, which is less than the NAV 1108, and that is paid to the participant on withdrawal. The second part is the difference between the units valued at NAV and at LAV 1110, which is the CDR. This amount is retained by the asset manager and invested in the DR sub-fund, and is allocated to each remaining participant per the fund rules 1112.
   b. During each interval t to t−1, early withdrawals from the PRIA funds generate contributions to the DR sub-fund as described above.
      i. Total CDR generated: CDR(f,t)=$\Sigma_1^P$ CDR(p,f,t)
      ii. This is an additional source of assets, besides the investment earnings, that are contributed to the DR sub-fund and. The CDR generates new units that can be allocated to remaining participants. In this embodiment, the CDR itself does not increase the NAV of the DR sub-fund. The product of the new units and the NAV is the total CDR generated.
   c. The total contribution generated across all participant actions have to be allocated to the remaining participants in the fund using allocation rules defined by the fund, for example pro-rata based on the number of assets or shares held in the fund at the end of the period net of in-period withdrawals.
      i. For allocation of the DR, the asset values used are only partially updated from the starting values
      ii. The starting values are increased for investment earnings net of sub-fund expenses and reduced for any withdrawal of assets, and do not consider any new deposits or any potential increase in the DR sub-fund assets iii. Denote this partially updated asset value for a participant at the lot level as PartialA(p,q,f,g,t)

iv. A participant's investment is valued at:

PartialA(p,f,t)=$\Sigma_1^G\Sigma_1^Q$PartialA(p,q,f,g,t)

v. The total assets invested in fund f has partially updated value of:

PartialA(f,t)=$\Sigma_1^P\Sigma_1^G\Sigma_1^Q$PartialA(p,q,f,g,t)

d. Any participant who makes a voluntary early withdrawal will have a net effect of 2 items. The first is the reduction in the participant's amount of DR sub-fund assets and units reflecting a proportion of the amount withdrawn. The second is the increase in the participant's amount of DR sub-fund assets and units resulting from an allocation of the CDR generated by that withdrawal e. In this embodiment, new deposits do not receive an allocation of the CDR generated in that period. The fund's rules would define the first period from which new deposits would be able to receive an allocation of the CDR generated in that period, for example, from the period following the deposit, or after a certain number of days, months or years from deposit.

f. The addition of new funds to the DR fund is treated as a new deposit by a participant, so it follows the mechanics above. The deposit will be treated as new investment lot, θ.

i. Amount of deposit in DR sub-fund for participant p during interval t−1 to t is $$DepA(p, \theta, f, DR, t) = CDR(f, t) \times \frac{PartialA(p, f, t)}{PartialA(f, t)}$$

ii. Number of units in DR sub-fund due to the deposit is amount invested divided by the DR sub-fund's closing NAV:

DepU(p,θ,f,DR,t)=DepA(p,θ,f,DR,t)÷NAV(f,DR,t)

iii. Check: Sum over all new lots for all participants should equal the total CDR CDR(f,t)=$\Sigma_\theta$DepA(p,θ,f,DR,t)

Ending Values at t

Once all the in-period flows have been calculated, the ending values of assets, units and shares can be calculated and then sent back to the asset manager administration system. Update from the most granular level and then aggregate as described in the Starting values section.

1. For participant p's lot q in fund f's sub-fund g
   a. Assets in g:
      i. Reduce starting assets by amount of any withdrawals (voluntary, death, scheduled), add new deposits and investment income and deduct expenses.
      ii. For the DR sub-fund, add the net increase in CDR
      iii. A(p,q,f,g,t)=A(p,q,f,g,t−1)−WA(p,q,f,g,t|w)−DA(p,q,f,g,t)−SA(p,q,f,g,t)+DepA(p,δ,f,g,t)+ΔA(p,q,f,g,t)−ExpG(p,q,f,g,t)+{depA(p,θ,f,DR,t) if g=DR sub-fund}
   b. Units in g:
      i. Units are decreased and increased by withdrawals and new deposits
      ii. Units are not changed due to investment income and expenses (which change NAV)
      iii. U(p,q,f,g,t)=U(p,q,f,g,t−1)−WU(p,g,f,g,t|w)−DU(p,q,f,g,t)−SU(p,q,f,g,t)+DepU(p,δ,f,g,t)+{DepU(p,θ,f,DR,t) if g=DR sub-fund}
   c. Check: A(p,q,f,g,t)=NAV(f,g,t)×U(p,q,f,g,t)
   d. This information is returned to the asset manager administration system. The asset manager should be able to validate their own calculations for units and asset values for all the non-DR sub-funds. In an alternative embodiment, the asset manager administration system may perform these calculations for the non-DR sub-funds, which may then be validated in the PRIA overlay system. The new data for the asset manager is the updated DR sub-fund units and values and the fund f shares and values. Aggregation can then be done in the same way as for Starting values. For completeness, that is described in full below.

2. (P,G,F) Participant and fund perspectives: Sum over all lots q to give participant p's investment in fund f's sub-fund g:
   a. Assets in g: A(p,f,g,t)=$\Sigma_1^Q$A(p,q,f,g,t)
   b. Units in g: U(p,f,g,t)=$\Sigma_1^Q$U(p,q,f,g,t)
   c. Check: A(p,f,g,t)=NAV(f,g,t)×U(p,f,g,t)

3. (P,F) Sum over all sub-funds g to give participant p's total investment in fund f
   a. Assets in f: A(p,f,t)=$\Sigma_1^G$A(p,f,g,t)=$\Sigma_1^G\Sigma_1^Q$A(p,q,f,g,t)
   b. Shares in f: S(p,f,t)=A(p,f,t)×S(f,t)÷A(f,t)
      i. Meaningless to aggregate units in g over all sub-funds
      ii. Shares, S, in f signify proportion of total fund f assets owned by participant p
   c. Check: A(p,f,t)=S(p,f,t)×SAV(f,t)

4. (F) Sum over all participants p to give total investment in fund f
   a. Assets in f: A(f,t)=$\Sigma_1^P$A(p,f,t)=$\Sigma_1^P\Sigma_1^G\Sigma_1^Q$A(p,q,f,g,t)
   b. Shares in f: S(f,t)=$\Sigma_1^P$S(p,f,t)
   c. Check: A(f,t)=S(f,t)×SAV(f,t)

Next, aggregate from a sub-fund's perspective up to the fund level. The starting point is the same as in the first two bullets, so those are not repeated here.

5. (G.F) Sum over all participants p to give total investment in fund f's sub-fund g:
   a. Assets in f: A(f,g,t)=$\Sigma_1^P$A(p,f,g,t)=$\Sigma_1^P\Sigma_1^Q$A(p,q,f,g,t)
   b. Units in g: U(f,g,t)=$\Sigma_1^P$U(p,f,g,t)=$\Sigma_1^P\Sigma_1^Q$U(p,q,f,g,t)
   c. Check: A(f,g,t)=NAV(f,g,t)×U(f,g,t)

6. (F) Sum over all sub-funds g to give total investment in fund f:
   a. Assets in f: A(f,t)=$\Sigma_1^G$A(f,g,t)=$\Sigma_1^G\Sigma_1^P\Sigma_1^Q$A(p,q,f,g,t)
   b. Units are not aggregated since that is meaningless
   c. Check: A(f,t) is the same value as calculated in bullet 4 above Next, aggregate up to the asset manager level.

7. (P,M) Sum over all funds f to give participant p's total investment in asset manager M's PRIA funds:
   a. Assets in M: A(p,t)=$\Sigma_1^F$A(p,f,t)=$\Sigma_1^F\Sigma_1^G\Sigma_1^Q$A(p,q,f,g,t)
   b. Shares in f are not aggregated since that is meaningless 8. (M) Sum over all funds f and participant p to give the total assets in M's PRIA funds:
   a. Assets in M: A(t)=$\Sigma_1^P$A(p,t)=$\Sigma_1^P\Sigma_1^F\Sigma_1^G\Sigma_1^Q$A(p,q,f,g,t)
   b. Check: A(t)=$\Sigma_1^F$A(f,t) which sums the assets in bullet 6 above In addition to these ending values, the following per unit or per share values would also be calculated:

9. Net asset value, NAV, of sub-fund, g:
   a. NAV is $$NAV(f, g, t) = \frac{A(f, g, t)}{U(f, g, t)}$$

b. Check NAV for each lot: A(p,q,f,g,t)=U(p,q,f,g,t)×NAV(g,t)

10. Share asset value, SAV of fund, f:
    a. The SAV is updated in proportion to the growth in asset value over the period, i.e., $$SAV(f, t) = \frac{A(f, t)}{A(f, t-1)} \times SAV(f, t-1)$$

b. A participant's share in fund f is then updated in proportion to the assets invested, i.e., $$S(p, f, t) = \frac{A(p, f, t)}{A(f, t)} \times S(f, t)$$

c. Check NAV for each participant: A(p,f,t)=S(p,f,t)×SAV(f,t)

Considerations for PRIA Fund Implementation.

Having described the PRIA systems, software, and calculations in some detail, there are some practical implementation aspects that are considered as part of this invention.

Legal Form:

The legal form of a PRIA fund, and of its sub-funds, will depend on the laws and regulations in place at the time and place of its establishment. In one embodiment, the PRIA fund is set up as an investment trust, and the sub-units are sub-accounts of that trust. In another embodiment, the PRIA fund is set up as an investment company, with all participants also acting as shareholders; the DR sub-fund then becomes the retained assets that are allocated proportionately to the participant shareholders. In another embodiment, the PRIA fund is set up as a fund-of-funds investment vehicle, with investors able to allocate their investments to the available sub-funds. These examples highlight the claim that embodiments of this invention can be structured and implemented in different ways that preserve the innovation described herein.

Regulatory Treatment:

Since the PRIA fund operates as an investment fund, its treatment in the US should be consistent with other investment funds. In other regulatory environments, the same treatment should apply if the same criteria are considered. However, there may be other reasons why a PRIA fund may be regulated differently in other jurisdictions. For example, in some jurisdictions, it may be regulated as an insurance fund, even though it does not operate as one, as defined earlier in this document. The invention described herein can be implemented under different regulatory treatment as well, since the invention does not rely on a particular regulatory treatment in order to be economically viable.

Source of Funds and Tax Treatment:

The legal form and regulatory treatment will influence the tax treatment of PRIA investments for both the asset manager and the individual investor. The source of the investment funds and the form of any associated retirement plan will also determine the tax treatment. In the description above, the initial and periodic deposits into a PRIA fund were identified as being made by the individual investor. With many retirement savings plans, the source of funds available to an individual are the individual's own contributions from either pre-tax or after-tax savings, an employer's contributions as part of a defined contribution or similar retirement plan, and government contributions as part of a national savings program. Irrespective of the source of funds and type of savings plan, the mechanics of the PRIA fund described herein still apply since all those funds are available to invest in a manner determined by the individual investor. Their tax treatment, however, may be different. In the US, for example, the following summarizes some of the possible tax treatments:

i. If PRIA is offered as an investment option under a qualified employer-sponsored retirement plan (e.g., 401(k)), then all capital gains and income earned during the accumulation phase would not be taxed, but all withdrawals would be taxed as ordinary income.

ii. If PRIA is offered as an investment option under a qualified Individual Retirement Account (IRA), then all capital gains and income earned during the accumulation phase would not be taxed, but all withdrawals would be taxed as ordinary income.

iii. If PRIA is offered through an ordinary non-qualified investment account, where the investment deposits are made from after-tax savings, then all capital gains and income would be taxed as it is vested and earned.

iv. If PRIA is offered as an insurance company Separate Account (in which case some insurance features may have to be added), then all capital gains and income earned during the accumulation phase would not be taxed, but all withdrawals would be taxed as ordinary income.

Outside the US, other savings programs may also utilize PRIA. For example:

i. If PRIA is offered as a supplementary savings vehicle to a country's national retirement program, then PRIA deposits may be sourced from both additional individual contributions and re-allocation of accumulated savings in the national retirement program, and the tax treatment would be based on the country's local laws.

ii. If an employer-sponsored defined contribution plan is offered using PRIA as the means by which an employer and individual participants make contributions and select investment choices, then the tax treatment may be consistent with other retirement plans in the country.

These examples illustrate the variety of ways in which PRIA can be implemented, but they are not meant to be an exhaustive list.

Fund Complexity:

The design of the PRIA fund and its sub-funds can range from the very simple to the very complex, as illustrated in FIG. 12. A complex PRIA fund 1202 has several sub-funds, each of which can be a different type of investment vehicle, ranging for example, from a single security to a mutual fund. This illustration shows a complex fund design with G sub-funds, one of which is the DR sub-fund 1204. It is feasible for the complex fund design to include more than one DR sub-fund. For all practical purposes, since the DR sub-fund(s) are managed at the discretion of the asset manager, and that in the illustrated embodiment the participant cannot buy units in it or sell units in it at their discretion, multiple DR sub-funds that each conform to the rules established for the PRIA fund would have the same impact as if they were all collapsed under a single DR sub-fund and managed at the discretion of the asset manager. Therefore, showing one sub-fund DR is sufficient to capture a complex fund design. In an alternative embodiment, if a PRIA fund is established with several DR sub-funds with different rules applying to each separate DR sub-fund, then it would not be feasible to collapse them into a single DR sub-fund.

The PRIA fund design can be simplified so that the asset manager offers only one sub-fund that the participant can invest in, and only one DR sub-fund 1206. In this case, there would be no difference in the calculations performed for the complex design 1204, and those performed for the less complex design 1206, other than the number of sub-funds.

The simplest fund design would be a single fund 1208 through which all investments are made, and in which the DR assets are commingled with the non-DR assets. Conceptually, this is the same as the less complex design 1206, except that the two sub-funds (one available for investing and the other the DR sub-fund) are merged into one. The calculations described above could be simplified somewhat since the distinction between a fund and a sub-fund need not be made. Otherwise, the calculations remain essentially the same as in the other PRIA fund designs.

Payout Schedule Specification:

As noted above, a participant self-selects a payout schedule at inception, and may be permitted to modify this schedule from time to time by the asset manager's fund's rules. There are several ways in which an asset manager may implement the specification of a payout schedule. In one embodiment, a participant may be permitted to specify a single payout schedule that applies to all the lots that the participant owns in all the sub-funds, and the participant designates which lots are to be sold fully, or in part, at each payment date to meet the scheduled payout. At the other extreme, another embodiment may permit a participant to treat each new deposit separately and independently of the payout schedule of another lot, and the distinct PRIA fund account (and account number) for each deposit that the participant makes in that same PRIA fund. In another embodiment, an asset manager may permit a participant to open several accounts, each with a distinct payout schedule that applies to all lots from initial and subsequent deposits made through that account.

LAV Formulation:

As noted earlier, the LAV formulation drives the amount of DR generated. This means that the LAV formula and the associated DR fund are tied together. An asset manager can choose to offer PRIA funds that differ by LAV formula, but are otherwise the same. For example, a PRIA fund with a relatively lower LAV than another PRIA fund could attract participants who want to maximize the potential growth in their investment portfolio, and are willing to leave a lower amount to their heirs upon death, or are willing to accept a lower return on early withdrawal. In an alternative embodiment, an asset manager may choose to offer one PRIA fund, with different series of mini-PRIA funds, each having their own LAV formula and associated DR sub-fund, and a common set of sub-funds for all participants. This embodiment is identical to one where each mini-PRIA fund is set up as an independent PRIA fund with its own LAV and associated DR sub-fund.

Vesting:

An embodiment of the invention can include a feature where participants have to be vested in the PRIA fund before some features are available to them. For instance, they may be required to be participants for a minimum period, say 2 years, before they are credited with any DR units. Alternatively, a vesting schedule may be introduced as a factor in the LAV formula to determine the payout on early withdrawal.

Bonus Units:

An embodiment may include some funds that may offer bonus units at various times. The units credited in the DR sub-fund are essentially bonus units since there is no additional investment required of the participant in order to earn those units. Other factors may be used to enable participants to earn bonus credits, which are then used to allocate DR or other sub-fund units.

Loans:

Some PRIA funds may permit investors to take loans against their invested assets. Loans are a useful way to allow participants to obtain funds without having to sell their shares investments in the fund. There are likely to be regulatory limitations on loans that are available from investment funds. However, loans from investment funds are fairly common, as evidenced by the operation of margin accounts with investment funds. Such a loan facility would have to implement specific rules to recognize that not all of a participant's invested assets are immediately available on demand. For example, loans may only be made against assets invested in non-DR sub-funds, and the collateral calculation would be based on the LAV and not on the NAV.

On withdrawal or payout before the loan is fully repaid, the proceeds of unit sales would be used to pay down the loan before any funds are paid to the participant. Interest on any outstanding loan can be paid directly by the participant or be drawn as an additional loan from the fund.

$2^{nd}$-to-die PRIA funds: Some annuities offer the opportunity for individuals to receive annuity income until the $2^{nd}$ of two annuitants dies. These $2^{nd}$-to-die annuities can be useful for married couples, for example, who require income while both of them are living, and want that income to continue while only one of them is living, even if the amount is reduced at that point. Conventional investment funds are not structured with a $2^{nd}$-to-die feature. A PRIA fund can be structured to offer a feature that mimics the $2^{nd}$-to-die feature, even though it is not an annuity or guaranteed.

To ensure equity with other participants, one embodiment of a $2^{nd}$-to-die PRIA fund could be set up so that only joint investors can participate at inception, and they can continue to make deposits so long as the account remains in joint name. The scheduled payout pattern would be modified to reflect payouts when both parties are alive and when only one is alive. There may also be some limitations on the relationship of the joint account holders so as to ensure that there is a bona fide relationship between the two that is appropriate for investing in such a fund. For example, spouses may be allowed since their age gap tends to be fairly narrow, although a parent and child may not be allowed since their age gap is quite wide.

Guarantees:

Some investors may want to invest in funds that offer certain investment or payout guarantees. Such guarantees are not envisaged within a PRIA fund. They can, however, be offered through a separate contract with an appropriately licensed financial institution (e.g., an insurer), with the guaranteed benefits coordinating with the payout pattern expected from the PRIA fund. For example, a participant who wishes to have a lifetime annuity income may be able to buy such an annuity commencing once their PRIA assets have been substantially or fully liquidated. In that case, such an annuity would start at a later date than an individual's normal retirement date, and would consequently be cheaper to buy.

Alternatively, a guarantee can be integrated into the PRIA fund design, in which case more complex accounting and reserving treatment may be required, similar to products offered by insurance companies.

In some embodiments, the system implements a combination of characteristics and restrictions within the system that together provide significant advantages that were not previously contemplated or understood. The system can provide an unrestricted investment option. Participants would not need to go through an underwriting process and participants in each fund would not need to be required to be in the same demographic classification (insurance classification) in order to stabilize insurance risks. The system can implement the fund to be open ended in that there is no set date of closing or terminating the fund. The system can keep the fund open and allow participants to join and end their participation over time and to allow withdrawals and deposits over time in the open rolling fund. For example, the system can configure the fund to continue to reconstitute itself with new participants as earlier participants terminate their accounts or are paid to completion under their payment schedule. The system can be configured to be without guarantees on the rate of return or the amount of benefit that the participant will receive. The system will provide the benefit based on rolling change in the funds deposited into the demographic fund that results from new deposits and permitted withdrawals. The system will also provide the benefit of participants market return on their investment (subject to the restrictions that certain withdrawal will trigger an automatic deduction and deposit in to the demographic return fund). The system can also implement a restriction that tracks whether participants have died and terminates those accounts as early withdrawals to the extent they have not been paid under their prescribed schedule. As such, the system can potentially prevent the account to be passed to and possessed by one or more beneficiaries and requires the termination. The system can also evaluate whether an early withdrawal is taking place and applies the automatic deduction. Another system benefit can be that the participant's ownership in the demographic return fund can be significantly funded by others in the fund, those who died early or withdrew their funds before payments under the schedule. This arrangement can motivate the fund to be long term investment and motivate participation in the fund based on the expectation that the participant will outperform other participants and will be enriched by the other participants. The system can also have an automated process for checking whether to close the fund based on one or more thresholds. In combination of some or all of these, and other aspects mentioned herein, the systems can provide a new tool for advancing data management and driving investment, which may have particular motivation for retirement directed investing.

As described above, a computer or computer system with network connections and data storage implement features and embodiments of the present invention. The computer or computer system can communicate and interact with other devices to receive funds or information, authorize or authenticate participants, formulate and report current values to end devices, or provide other functionality, tools, or interactions. Referring to FIG. 13, Computer system 1 can include a display interface 2 that forwards graphics, text, and other data from the communication infrastructure 6 (or from a frame buffer not shown) for display on the display unit 30.

As such, computer system can generate signals or control the generation and display of graphics, GUI, other visuals or related interactivity on an attached display or a remote computer system (e.g., a PC client through a web browser). Computer system 1 also includes a main memory 8, preferably random access memory (RAM), and may also include a secondary memory 10. The secondary memory 10 may include, for example, a hard disk drive 12 and/or a removable storage drive 14, representing a floppy disk drive, a magnetic tape drive, an optical disk drive, etc. The removable storage drive 14 reads from and/or writes to a removable storage unit 18 in a well-known manner. Removable storage unit 18, represents a floppy disk, magnetic tape, optical disk, etc., which is read by and written to removable storage drive 14. As will be appreciated, the removable storage unit 18 includes a computer usable storage medium having stored therein computer software and/or data.

In alternative embodiments, secondary memory 10 may include other similar devices for allowing computer programs or other instructions to be loaded into computer system 1. Such devices may include, for example, a removable storage unit 22 and an interface 20. Examples of such may include a program cartridge and cartridge interface (such as that found in video game devices), a removable memory chip (such as an erasable programmable read only memory (EPROM), or programmable read only memory (PROM)) and associated socket, and other removable storage units 22 and interfaces 20, which allow software and data to be transferred from the removable storage unit 22 to computer system 1.

Computer system 1 may also include a communications interface 24. Communications interface 24 allows software and data to be transferred between computer system 1 and external devices. Examples of communications interface 24 may include a modem, a network interface (such as an Ethernet card), a communications port, a Personal Computer Memory Card International Association (PCMCIA) slot and card, etc. Software and data transferred via communications interface 24 are in the form of signals 28, which may be electronic, electromagnetic, optical or other signals capable of being received by communications interface 24. These signals 28 are provided to communications interface 24 via a communications path (e.g., channel) 26. This path 26 carries signals 28 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 14, a hard disk installed in hard disk drive 12, and signals 28. These computer program products provide software to the computer system 1.

Computer programs (also referred to as computer control logic) are stored in main memory 8 and/or secondary memory 10. Computer programs may also be received via communications interface 24. Such computer programs, when executed, enable the computer system 1 to perform the features of embodiments of the present invention, as discussed herein. In particular, the computer programs, when executed, enable the processor 4 to perform such features. Accordingly, such computer programs represent controllers of the computer system 1.

In an embodiment where the invention is implemented using software, the software may be stored in a computer program product and loaded into computer system 1 using removable storage drive 14, hard drive 12, or communications interface 24. The control logic (software), when executed by the processor 4, causes the processor 4 to perform the functions or features described herein. Data as part of one or more databases or storage structures can also be part of the computer system and work together with the other components to provide new tools operations, systems, or features to managers and participants. In another embodiment, the features are implemented primarily in hardware using, for example, hardware components, such as application specific integrated circuits (ASICs). Implementation of the hardware state machine so as to perform the functions described herein will be apparent to persons skilled in the relevant art(s). In yet another embodiment, a combination of both hardware and software can be used.

A computer system can be used that comprises one or more computers or computer systems. Depending on the arrangement, a display unit that is attached to the computer system (e.g., using a VGA cable) or to one of the computer systems may not be necessary. A computer system and a computer are used interchangeably throughout the description.

As shown in FIG. 13, embodiments of the present invention may be implemented using hardware, software, or a combination thereof, and may be implemented in one or more computer systems or other processing systems.

The local storage can include volatile memory (such as RAM) and/or non-volatile memory (such as ROM as well as any supplemental levels of memory, including but not limited to cache memories, programmable or flash memories and read-only memories). Additionally, any storage techniques used in connection with the presently disclosed method and/or system may invariably be a combination of hardware and software.

One or more features illustratively described herein can be implemented individually or in various combinations. The present system, method, or related inventions also relate to a non-transient computer readable medium and can include one or more software applications that implement embodiments of the system on hardware. The software application can be a set of instructions readable by a processor and stored on the non-transient computer readable medium. Such medium may be permanent or semi-permanent memory, such as hard drive, floppy drive, optical disk, flash memory, ROM, EPROM, EEPROM, etc., as would be known to those of ordinary skill in the art.

The computer or computer system can communicate and interact with other computers or computer systems such as those of banks, participants, or administrators. Such interaction can be with mobile devices, laptops, or other types of computer or computers systems. A software application or website can be implemented to provide end users access to features and interactivity of the computer system that implements and provides the investment fund having the demographic return feature. The computer system that provide the investment fund (and include related infrastructure) are preferably configured to send signals or packets to end devices that are executed or used by the end devices to generate data, graphics, interactive tools, or other features. As such, the computer system can include an interface that sends signals or packets that when received generate a user interface or other prescribed functionality on end devices.

It will be understood by those of ordinary skill in the art that described interfaces, components, or modules are related to descriptions herein when the descriptions are directed to the same or related features of the interface, component, or module.

Embodiments of the present invention are described as an overlay system. In other embodiments, the system would not be implemented as an overlay system but would instead be a standalone system (which of course would also communicate with other systems as described herein or as appropriate). The technology described herein would form the standalone system that incorporates the overlay system into an integrated system for PRIA.

Features or characteristics described in one context, process, or device are applicable to other context, process or devices described herein. The steps of the processes illustratively described herein can be performed in a different order, if desired. Also, steps could be added or removed from the processes illustratively described herein. The processes, features, or steps illustratively described herein can be implemented in software and data (in computer readable medium, transient and/or nontransient) using the described examples of hardware and network configurations.

It should be understood that features or functionality described herein such as by way of different functional block diagrams can be implemented with one or more computer systems (a single computer or multiple computers) and with one or more software modules that can be implemented in a single or multiple computer to provide one or more of the features or functionality.

For the purpose of clarification, to the extent that the description herein does not explicitly state that certain described portions are computer implemented or are carried out using computers, it would be understood to those of ordinary in the skill in the art from the specification that a computer implemented configuration is contemplated.

In general, the use of "may" or "can" indicates that this one implementation, but technology is not limited just to this one implementation.

It would be understood that it is within contemplation that different feature, steps, or processes can be combined to arrive at new inventions.

The terms and expressions which have been employed in the specification are used as terms of description and not of limitations, there is no intention in the use of such terms and expressions to exclude any equivalents of the features shown and described or portions thereof, but it is recognized that various modifications are possible within the scope of the claims to the invention.

What is claimed is:

1. A computer implemented system comprising:
an electronically demographic return fund that is created, managed and exists only within a new type of open-ended investment program, and its processes and system to implement the transfer of wealth between unrelated individual participants using a new method (that is not used by insurance companies or by actuaries) and system that eventually provides participants with an income stream;
a fund design system that enables an asset manager to design, customize and simulate features of the system that includes the investment program, and within it, one or more pre-existing investment funds (which also exist outside of the investment program) and one or more demographic return funds (which exist only inside the investment program);
an asset manager application system to administer the operation of the investment management system as an overlay within the asset manager's firewall;
a participant applications portal to enable users (individual participants and their financial advisors) to simulate, test and customize the options they select to manage their wealth;

wherein:
the electronically managed demographic return fund is created automatically at inception of the system and operates automatically by electronic signals that implement the design selections by the asset manager so that:
a demographic return account is created automatically for each participant on the date they join and in which ownership units are automatically allocated and withdrawn (used) based on the electronic signals that track a participant's entry and exit events over time;
wealth is automatically transferred from the pre-existing investment funds into the demographic return fund only when a participant exits the system through death or other full or partial exit (withdrawal), and that wealth amount is immediately expressed as ownership units in the demographic return fund;
a participant receives automatic allocations of ownership units due to the transfer of wealth from other participants, and never makes a deposit of funds into their own demographic return account;
a participant is not allowed to discretionarily buy additional ownership units or discretionarily sell ownership units in their demographic return account a participant is not entitled to all the assets represented by the ownership units allocated to their demographic return account, and is only entitled, at each date of the automatic sale of ownership units, to that portion relating to the units that are automatically sold on their behalf from time to time;
a participant receives automatic payments of income when some ownership units are sold according to a pre-determined payout schedule;
assets in the demographic return fund are managed by a designated asset manager on behalf of all participants, and not by the individual participants themselves;
the fund design system is configured to be used by a user (an asset manager or their advisor) to:
design, customize and simulate the operation of an investment program that includes pre-existing investment funds and a demographic return fund;
the fund design system is configured to include:
a menu from which a user can select several demographic return fund features to customize and test, and ultimately develop a version to be offered to participants;
a menu to select pre-existing investment funds (e.g., savings and retirement accounts including IRAs and 401(k) accounts) available in the open market to simulate where investors my make discretionary deposits and withdrawals of their wealth (savings) into asset classes (e.g., stocks, bonds, mutual funds) within such pre-existing investment funds, loading data regarding characteristics of available asset classes such as historical performance and drivers for future performance of those selected pre-existing investment funds;
a first input interface to receive the number of time periods (e.g., months or years) that the simulation should run;
a second input interface to receive probability distributions and other statistical, accounting, and operational measures for simulation parameters;
a third input interface to specify one or more economic conditions in simulated future scenarios and time horizons;
and, in response to the settings and inputs, the fund design system is configured to run simulations of the demographic return fund customized per the programmed settings and user inputs and then display the simulation output to the user wherein the fund design system is configured to:
perform simulations at an individual participant level, a cohort level (i.e., all individual participants who share the same start date on which they join the system) and a population level (i.e., all cohorts over all past and future start dates on which participants did join and can join), including operations using mortality and withdrawal statistics similar but not limited to actuarial tables, and generate a level of persistency of participants in the demographic return fund;
allow a user to create the demographic return fund for implementation and operation using the settings and inputs developed in the fund design system;
the asset manager application system comprising one or more computers and connected electronic storage that stores computer-executable instructions and data that is used by the computer-executable instructions, wherein the asset manager application system comprises:
a data warehouse containing static and dynamic data for administering an asset manager's operations;
data integration and data access module that controls input and output into the data warehouse;
front, middle, and back-office applications that allow users to manage day-to-day operations;
synchronous and asynchronous business logic that provides these applications access to information stored in the data warehouse;
business rules and work flows that manages such communications within the asset manager application system;
an automated fund-termination component that is configured to determine, as an ongoing process:
whether a certain minimum amount of investment remains in the investment program,
a certain minimum number of participants remain in the investment program, or
a certain minimum level of diversity in participant classification is maintained,
and in response, close the investment program when the data reflect that the investment program does not meet such operating criteria;
wherein the asset manager application system is configured to:
register the participants in the investment program;
receive and store personal information about the participants;
create individual accounts for participants in the investment program, the pre-existing investment funds and separately in the demographic return fund, wherein accounts are available to be created in the same investment program for participants that are in multiple classifications;

a fund module overlay system implemented behind a firewall of the asset manager application system and configured to be an overlay added to the pre-configured conventional asset manager application system:
  that manages many pre-existing investment funds for the asset manager application system and
  which communicates with the data integration and data access module of the asset manager application system,
  the front, middle, and back office applications of the asset manager application system, and
  synchronous-and asynchronous business logic of the asset manager application;
wherein the fund module overlay system comprises:
  one or more computers and connected electronic storage that stores computer-executable instructions and data that is used by the computer-executable instructions,
  wherein the one or more computers, the computer-executable instructions, and data, together, configure the computer system to provide an interactive application that processes a structure for the operation of the investment program, the pre-existing investment funds and the demographic return fund in combination,
  wherein the structure governs the operation of the demographic return fund providing the demographic returns, comprising an increase in ownership unit value and updating the number of ownership units allocated to each participant, due to the survival of participants in the investment program;
whereby the computer is configured to:
  provide an account creation interface through which participants self-select a start date and payment schedule for a liquidation phase of their account, wherein the self-select start date can be configured to begin immediately or at some time in the future;
  receive and store principal data identifying one or more investment contribution deposits made by each participant into their choice of pre-existing investment funds;
  determine investment fund ownership from the investment contribution deposited by each participant into their choice of pre-existing investment funds;
  determine-when an individual participant in the investment program dies and in response, automatically deduct a portion of the total amount (wealth) in the corresponding dead participant's pre-existing investment funds and deposit the deducted portion into the demographic return fund;
  create new ownership units in the demographic return fund when a portion of a dead participant's wealth is deposited into the demographic return fund, and then allocate the created ownership units to each surviving participant in the investment program;
  determine the allocation of demographic return fund ownership units for each participant whenever such units are created, or otherwise made available, based on a pre-determined allocation method, for instance in proportion to the value of their total wealth across all their pre-existing investment funds;
  implement a client life status interface through which a participant's death is reported to the system and the system automatically closes individual accounts in the investment program upon notification of each participant's death;
  implement an automated trigger over a repeated time interval that achieves concurrency between actual activity in the pre-existing investment funds and the demographic return fund:
    wherein the trigger automatically tracks and records participant actions including participant deaths, and in response to the trigger, the computer system automatically applies an operation to the demographic return fund using information from the tracked activity at the end of the time interval comprising:
      automatically changing the demographic return fund ownership units to remove the dead participant's ownership of demographic return fund units from the demographic return fund while retaining the value of the removed dead participant's demographic return fund ownership units in the demographic return fund and reallocating the returned units to remaining participants, and
    wherein the participants actions further include (i) withdrawals from the pre-existing investment funds due to death, (ii) voluntary withdrawals from the pre-existing investment funds, and (iii) voluntary deposits into the pre-existing investment funds, and
  a participant applications portal configured to be outside of the firewall that is configured to produce an interactive interface for participants to interact with the asset manager application system and the overlay system, wherein the participant application portal provides an interface through which an individual participant and/or their designated representative can:
    run simulations to test the consequences of selecting available options designed and offered by the asset manager,
    initiate-participation in the investment program and monitor the investment profile and performance, and
    after the participant joins, evaluate consequences of future changes that are available to the participant, and implement the changes they select.

2. The system of claim 1 wherein the account creation interface provides each participant with the option to select from different pre-existing investment vehicles for application of their investment contribution.

3. The system of claim 1 wherein the computer system is configured to include an administrative interface that provides interactive options that allow fund providers to configure working characteristics of the investment program, the pre-existing investment funds and the demographic return fund.

4. The system of claim 1 wherein the computer system is configured to include a sales system that provides models of the operation of the investment program incorporating a demographic return fund.

5. The system of claim 1 wherein the computer system implements a new type of open-ended investment program and within it, one or more pre-existing investment funds (which also exist outside of the investment program) and one or more demographic return funds (which exist only inside the investment program).

6. The system of claim 1 wherein the system further comprises an interface for interactivity with financial advisors or other intermediaries.

7. The system of claim 1 wherein the system further comprises that the ownership units in the demographic return fund are derived from the ownership stake in the investment program using a specified formula.

8. The system of claim 1, the system further configured to receive a request to open an account over network connections from a participant and store participant information specifying the classification of each participant, use that information in opening the account and setting up the investment program, and also uses the data in checking threshold information about classification to determine whether to close the investment program.

9. The system of claim 1, the computer system is further configured to allow a user to generate simulations to test an implementation of the demographic return fund, display graphs of the simulations, and in response to the simulations, launch a particular design of the demographic return fund using selected settings.

10. The system of 9 wherein the computer system is configured to include, as part of generating simulations and creating new designs, options with respect to participant population attributes, historical fund information including historical performance, drivers of future performance, production variables specifying variables, revenue and expense variables that tracks revenues and expenses as a result of offering the demographic return fund, statistical properties specifying the probability distributions for parameters and variables that are subject to dynamic simulations including data that specifies level of persistency, economic scenario drivers that specifies the economic conditions in simulated future scenarios and time horizons in which the demographic return fund is tested, wherein the options are used by the computer system to produce one or more simulations.

* * * * *